United States Patent
Qiao et al.

(10) Patent No.: US 12,261,670 B2
(45) Date of Patent: Mar. 25, 2025

(54) DIRECTIONAL MEASUREMENT METHOD AND DEVICE

(71) Applicant: HUAWEI TECHNOLOGIES CO., LTD., Guangdong (CN)

(72) Inventors: Liang Qiao, Shenzhen (CN); Jiayin Zhang, Shanghai (CN); Weiwei Fan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 245 days.

(21) Appl. No.: 17/855,631

(22) Filed: Jun. 30, 2022

(65) Prior Publication Data

US 2022/0337304 A1    Oct. 20, 2022

Related U.S. Application Data

(63) Continuation of application No. PCT/CN2019/130919, filed on Dec. 31, 2019.

(51) Int. Cl.
*H04B 7/06*    (2006.01)
*H04B 17/327*    (2015.01)
(Continued)

(52) U.S. Cl.
CPC ......... *H04B 7/0695* (2013.01); *H04B 17/327* (2015.01); *H04L 5/0048* (2013.01);
(Continued)

(58) Field of Classification Search
CPC ... H04B 7/0695; H04B 17/327; H04W 72/23; H04W 72/046; H04W 74/0833; H04L 5/0048

See application file for complete search history.

(56) References Cited

U.S. PATENT DOCUMENTS

2017/0346539 A1*   11/2017   Islam .................. H04B 7/0417
2018/0205422 A1    7/2018    Feldhahn et al.
(Continued)

FOREIGN PATENT DOCUMENTS

CN    106537806 A    3/2017
CN    109155652 A    1/2019
(Continued)

OTHER PUBLICATIONS

3GPP TS 36. 331 V15.6.0 (Jun. 2019), "3rd Generation Partnership Project; Technical Specification Group Radio Access Network; Evolved Universal Terrestrial Radio Access (E-UTRA); Radio Resource Control (RRC); Protocol specification (Release 15)," Jun. 2019, 960 pages.
(Continued)

*Primary Examiner* — Freshteh N Aghdam
(74) *Attorney, Agent, or Firm* — Fish & Richardson P.C.

(57) ABSTRACT

This application discloses a directional measurement method and a device. In this one example solution, a terminal device may determine a to-be-measured receive beam, and perform received signal strength indication (RSSI) measurement on the to-be-measured receive beam. The terminal device may perform RSSI measurement on the to-be-measured receive beam in a targeted manner, and does not need to perform RSSI measurement in all directions. Therefore, directional RSSI measurement of the terminal device can be implemented.

23 Claims, 8 Drawing Sheets

(51) Int. Cl.
  *H04L 5/00* (2006.01)
  *H04W 72/044* (2023.01)
  *H04W 72/23* (2023.01)
  *H04W 74/0833* (2024.01)
(52) U.S. Cl.
  CPC ......... *H04W 72/046* (2013.01); *H04W 72/23* (2023.01); *H04W 74/0833* (2013.01)

(56) References Cited

U.S. PATENT DOCUMENTS

2018/0262313 A1  9/2018  Nam et al.
2021/0058967 A1*  2/2021  Oteri ................. H04W 74/0808

FOREIGN PATENT DOCUMENTS

| CN | 109155655 A | | 1/2019 | |
|---|---|---|---|---|
| EP | 3168999 A1 | * | 5/2017 | ............... H04B 7/04 |
| WO | 2017204934 A1 | | 11/2017 | |

OTHER PUBLICATIONS

3GPP TS 38.331 V15.7.0 (Sep. 2019), "3rd Generation Partnership Project; Technical Specification Group Radio Access Network; NR; Radio Resource Control (RRC) protocol specification (Release 15)," Sep. 2019, 527 pages.
Apple Inc., "Consideration on beam measurement and reporting enhancement," 3GPP TSG RAN WG1 Meeting #95, R1-1812921, Spokane, USA, Nov. 12-16, 2018, 8 pages.
AT&T, "Beam Measurement and Reporting," 3GPP TSG RAN WG1 Meeting NR#3, R1-1716168, Nagoya, Japan, Sep. 18-21, 2017, 3 pages.
PCT International Search Report and Written Opinion issued in International Application No. PCT/CN2019/130919 on Aug. 28, 2020, 14 pages (with English translation).
Vivo, "Discussion on beam measurement and reporting," 3GPP TSG RAN WG1 #94bis, R1-1810408, Chengdu, China, Oct. 8-12, 2018, 2 pages.
Blandino et al., "Multi-User Hybrid MIMO at 60 GHz Using 16-Antenna Transmitters," IEEE Transactions on Circuits and Systems I: Regular Papers, vol. 66, No. 2, Feb. 2019, 11 pages.
EP Partial Supplementary European Search Report issued in European Application No. 19958328.7 on Nov. 14, 2022, 16 pages.
3GPP TS 38.215 V15.5.0, "3rd Generation Partnership Project; Technical Specification Group Radio Access Network; NR; Physical Layer Measurements (Release 15)," Jun. 2019, 16 pages.
3GPP TS 38.214 V15.7.0, "3rd Generation Partnership Project; Technical Specification Group Radio Access Network; NR; Physical Layer Procedures for Data (Release 15)," Sep. 2019, 106 pages.
3GPP TS 38.133 V16.1.0, "3rd Generation Partnership Project; Technical Specification Group Radio Access Network; NR; Requirements for Support of Radio Resource Management (Release 16)," Sep. 2019, 1045 pages.
3GPP TS 38.314 V0.0.3, "3rd Generation Partnership Project; Technical Specification Group Radio Access Network; NR; Layer 2 Measurements (Release 16)," Nov. 2019, 17 pages.
Extended European Search Report in European Appln No. 19958328.7, dated Feb. 10, 2023, 21 pages.

* cited by examiner

There is a one-to-one relationship between an SSB and an RO

There is a one-to-many relationship between an SSB and ROs

DIRECTIONAL MEASUREMENT METHOD AND DEVICE

CROSS-REFERENCE TO RELATED APPLICATIONS

This application is a continuation of international Application No. PCT/CN2019/130919, filed on Dec. 31, 2019, the disclosure of which is hereby incorporated by reference in its entirety.

TECHNICAL FIELD

This application relates to the field of communication technologies, and in particular, to a directional communication method and a device.

BACKGROUND

An unlicensed spectrum resource is used as assistance of a licensed spectrum resource, and a communication system is deployed on the unlicensed spectrum resource, so that a throughput of the communication system can be improved, and a spectrum resource shortage problem can be resolved to some extent. In a 5th generation ($5^{th}$ generation, 5G) mobile communication technology, a new radio (new radio, NR) system deployed on an unlicensed frequency band may be referred to as a new radio unlicensed (new radio unlicensed) system for short.

Currently, a plurality of access systems may be deployed on an unlicensed frequency band. In addition to the NRU system, a radar (radar) system, a wireless fidelity (wireless fidelity, Wi-Fi) system, a Bluetooth system, an access system of another different operator, and the like may be deployed.

However, communication devices in the plurality of access systems simultaneously perform signal transmission on the same unlicensed frequency band, and this may cause a signal interference problem. Especially, in an access system that supports beamforming, a signal interference problem is severer, A beam used by a communication device becomes narrower in an NRU system working in a high-frequency unlicensed frequency band of about 60 GHz, and supporting beamforming. Consequently, there are many hidden nodes in the NRU system.

Refer to FIG. 1. In a schematic diagram of signal interference in the NRU system, a base station a and a terminal device are performing communication in a downlink direction through a transmit beam (beam) Tx #A3 and a receive beam Rx #B2. If a hidden node sends a signal through a transmit beam Tx #C3 in a current scenario, the signal causes interference to receiving of the terminal device, in other words, the transmit beam Tx #C3 of the hidden node interferes with the receive beam Rx #B2 of the terminal device. However, the terminal device using the receive beam Rx #B2 cannot determine whether an interference beam from the hidden node exists in a direction of the receive beam Rx #B2 of the terminal device. As a result, the terminal device needs to perform interference measurement in the direction of the receive beam Rx #B2, to switch the receive beam and avoid signal interference from the hidden node.

Currently, a commonly used interference measurement mechanism includes received signal strength indication (received signal strength indication, RSSI) measurement. In a conventional RSSI measurement method, a base station usually configures an RSSI measurement timing configuration (RSSI measurement timing configuration, RMTC) window for a terminal device, and indicates the terminal device to perform RSSI measurement on a specified channel. Measurement time and a target frequency band are specified for the RMTC window. The target frequency band is an unlicensed frequency band. The terminal device performs, within the measurement time specified for the RMTC window, RSSI measurement on each measurement bandwidth included in the target frequency band specified for the RMTC window, where the measurement bandwidth is an LBT bandwidth. An RSSI measurement result of the terminal device is a total signal power value of the terminal device in the target frequency band, and the RSSI measurement result can reflect a load status or a signal transmission status in the target frequency band. After obtaining the RSSI measurement result, the terminal device reports the RSSI measurement result to the base station by using a measurement report, and the base station then performs a receive beam reselection process for the terminal device based on the RSSI measurement result.

It can be learned from the foregoing descriptions of the conventional RSSI measurement method that the base station configures only the RMTC window for the terminal device, and does not provide a directional RSSI measurement solution. With an increasing quantity of hidden nodes in a high-frequency unlicensed frequency band, how to perform directional RSSI measurement is a problem to be urgently resolved.

SUMMARY

This application provides a directional measurement method and a device, to implement directional RSSI measurement.

According to a first aspect, an embodiment of this application provides a directional measurement method, and the method is performed by a terminal device in a communication system. Steps of the method include: A terminal device determines a to-be-measured receive beam, and then performs received signal strength indication RSSI measurement on the to-be-measured receive beam.

According to the method, the terminal device may perform RSSI measurement on the to-be-measured receive beam in a targeted manner, and does not need to perform RSSI measurement in all directions. Therefore, in the method, directional RSSI measurement of the terminal device can be implemented, time and power that are consumed by the terminal device to perform RSSI measurement can be reduced, and RSSI measurement efficiency of the terminal device can be improved.

In a possible design, the terminal device may determine the to-be-measured receive beam by using the following steps:

The terminal device determines a first transmit beam, where the first transmit beam is a transmit beam used by a base station.

The terminal device determines a first receive beam based on a correspondence between a transmit beam of the base station and a receive beam of the terminal device, where the first receive beam is a receive beam, of the terminal device, corresponding to the first transmit beam.

The terminal device determines that the to-be-measured receive beam is the first receive beam.

According to this design, the terminal device may autonomously determine the to-be-measured receive beam.

In a possible design, the terminal device may determine the first transmit beam by using the following steps:

The terminal device obtains a signal index of a first downlink reference signal, where the first downlink reference signal is a downlink reference signal sent by the base station. The terminal device determines, based on a correspondence between a signal index of a downlink reference signal and a transmit beam of the base station, the first transmit beam corresponding to the signal index of the first downlink reference signal.

According to this design, the terminal device may determine the first transmit beam based on the signal index of the downlink reference signal of the base station.

In a possible design, the terminal device may obtain the signal index of the first downlink reference signal in the following manners.

Manner 1: The terminal device receives system information from the base station, and obtains the signal index of the first downlink reference signal from the system information. For example, the terminal device obtains an SSB index included in a MIB by demodulating the MIB.

Manner 2: The terminal device determines first random access information, where the first random access information is used by the terminal device to perform random access, and determines, based on a correspondence between random access information and a signal index of a downlink reference signal, the signal index, of the first downlink reference signal, corresponding to the first random access information.

Manner 3: The terminal device determines configuration information of a first uplink reference signal, where the first uplink reference signal is an uplink reference signal sent by the terminal device to the base station. The terminal device determines, based on a correspondence between configuration information of an uplink reference signal and a signal index of a downlink reference signal, the signal index, of the first downlink reference signal, corresponding to the configuration information of the first uplink reference signal.

In a possible design, the correspondence between the random access information and the signal index of the downlink reference signal is carried in RRC signaling. For example, in a scenario in which the terminal device uses a contention-based random access manner, a parameter "ssb-perRACH-OccasionAndCB-PreamblesPerSSB" in random access configuration information (RACH-ConfigCommon IE) may indicate the correspondence. For another example, in a scenario in which the terminal device uses a non-contention-based random access manner, a parameter "ssb-perRACH-OccasionAndCB-PreamblesPerSSB" in random access configuration information (RACH-ConfigDedicated IE) may indicate the correspondence.

In a possible design, the correspondence between the configuration information of the uplink reference signal and the signal index of the downlink reference signal is carried in RRC signaling. For example, a parameter "SRS-spatialRelationInfo" in an SRS configuration message (SRS-Config IE) sent by the base station to the terminal device indicates configuration information of an SRS and a signal index of a downlink reference signal that have a same spatial domain transmission filtering feature.

In a possible design, the first random access information is a random access time-frequency position of the terminal device, or the first random access information is a random access time-frequency position and a random access preamble of the terminal device.

In a possible design, the terminal device may further determine the to-be-measured receive beam by using the following steps:

The terminal device receives first measurement configuration information from a base station, where the first measurement configuration information is used to indicate the to-be-measured beam. Then, the terminal device determines the to-be-measured receive beam based on the first measurement configuration information.

According to this design, the base station may configure the to-be-measured receive beam for the terminal device, and notify the terminal device of the to-be-measured receive beam by using the first measurement configuration information.

In a possible design, the first measurement configuration information includes a signal index of a second downlink reference signal. That the terminal device determines the to-be-measured receive beam based on the first measurement configuration information includes the following steps:

The terminal device obtains the signal index of the second downlink reference signal included in the first measurement configuration information. The terminal device determines a second transmit beam based on a correspondence between a signal index of a downlink reference signal and a transmit beam of the base station, where the second transmit beam is a transmit beam, of the base station, corresponding to the signal index of the second downlink reference signal. The terminal device determines a second receive beam based on a correspondence between a transmit beam of the base station and a receive beam of the terminal device, where the second receive beam is a receive beam, of the terminal device, corresponding to the second transmit beam. The terminal device determines that the to-be-measured receive beam is the second receive beam.

According to this design, the terminal device may determine the to-be-measured receive beam based on the signal index, of the second downlink reference signal, specified by the base station.

In a possible design, the first measurement configuration information includes configuration information of a second uplink reference signal. The terminal device may determine the to-be-measured receive beam based on the first measurement configuration information by using the following two methods:

Method 1: The terminal device obtains the configuration information of the second uplink reference signal included in the first measurement configuration information. The terminal device determines a third transmit beam based on the configuration information of the second uplink reference signal, where the third transmit beam is a transmit beam used by the terminal device to send the second uplink reference signal. The terminal device determines a third receive beam of the terminal device based on the third transmit beam of the terminal device, where a configuration of the third receive beam is the same as that of the third transmit beam. The terminal device determines that the to-be-measured receive beam is the third receive beam.

Method 2: The terminal device obtains the configuration information of the second uplink reference signal included in the first measurement configuration information. The terminal device determines, based on a correspondence between configuration information of an uplink reference signal and a signal index of a downlink reference signal, a signal index, of a second downlink reference signal, corresponding to the configuration information of the second uplink reference signal. The terminal device determines a fourth transmit beam based on a correspondence between a signal index of a downlink reference signal and a transmit beam of the base station, where the fourth transmit beam is a transmit beam, of the base station, corresponding to the index of the second downlink reference signal. The terminal device determines a fourth receive beam based on a correspondence between a transmit beam of the base station and a receive beam of the terminal device, where the fourth receive beam is a receive beam, of the terminal device, corresponding to the fourth transmit beam, and determines that the to-be-measured receive beam is the fourth transmit beam.

According to this design, the terminal device may determine the to-be-measured receive beam based on the signal index, of the second uplink reference signal, specified by the base station.

In a possible design, the first measurement configuration information includes an identifier of a fifth transmit beam of the base station. That the terminal device determines the to-be-measured receive beam based on the first measurement configuration information includes the following steps:

The terminal device obtains the identifier of the fifth transmit beam included in the first measurement configuration information. The terminal device determines an identifier of a fifth receive beam based on a correspondence between an identifier of a transmit beam of the base station and an identifier of a receive beam of the terminal device, where the identifier of the fifth receive beam is an identifier, of a receive beam of the terminal device, corresponding to the identifier of the fifth transmit beam. The terminal device determines that the to-be-measured receive beam is the fifth receive beam.

According to this design, the terminal device may determine the to-be-measured receive beam based on the identifier, of the fifth transmit beam of the base station, specified by the base station.

In a possible design, a receive beam and a transmit beam of the terminal device have indexes, and a receive beam and a transmit beam of the base station also have indexes.

For example, in this embodiment of this application, a beam index may be defined in the following manners.

Manner 1: The beam index is defined by using an index/ID of a related DL-RS or UL-RS (a DL-RS or a UL RS that needs to be sent through a beam). The DL-RS may be an SSB, or may be a CSI-RS, The UL-RS may be an SRS or a newly defined RS.

Manner 2: The beam index is defined based on a beam direction. This definition manner is actually an implementation behavior of the terminal device or the base station. To be specific, the terminal device or the base station may define different transmit beam indexes and receive beam indexes by setting an angle of departure of a transmit beam or an angle of arrival of a receive beam.

In a possible design, the method further includes: The terminal device receives second measurement configuration information from the base station, where the second measurement configuration information is used to indicate an RSSI measurement timing configuration RMTC window. In this case, the terminal device may perform RSSI measurement on the to-be-measured receive beam in the RMTC window.

According to this design, the terminal device may perform RSSI measurement based on the RMTC window configured by the base station.

In a possible design, before that a terminal device determines a to-be-measured receive beam, the method further includes the following step: The terminal device determines that there is interference on a current downlink receive beam. Alternatively, the terminal device receives a notification message from the base station, where the notification message is used to notify the terminal device to perform RSSI measurement.

According to this design, the terminal device may perform RSSI measurement when determining that there is interference on the current downlink receive beam, so that a downlink receive beam may be switched based on an RSSI measurement result.

In a possible design, the terminal device may determine in, but not limited to, the following manners, that there is interference on the current downlink receive beam.

Manner 1: In a process in which the terminal device receives downlink data through the current downlink receive beam, the terminal device determines that a first data transmission quality parameter within first specified duration exceeds a first specified quality threshold, or determines that a second data transmission quality parameter within first specified duration is less than a second specified quality threshold.

For example, the first data transmission quality parameter includes at least one or a combination of the following: a quantity of failure response messages (NACKs) generated for downlink data, a block error rate, a bit error rate, and the like. The second data transmission quality parameter includes at least one or a combination of the following: a quantity of success response messages (ACKs) generated for downlink data, a correct transmission block rate, a correct transmission bit rate, and the like.

Manner 2: After performing RSRP measurement on the current downlink receive beam, the terminal device determines that an RSRP measurement result is less than an RSRP threshold.

In a possible design, after the terminal device performs RSSI measurement on the to-be-measured receive beam, the method further includes the following steps:

The terminal device obtains an RSSI measurement result of the to-be-measured receive beam.

When there are a plurality of to-be-measured receive beams, the terminal device separately quantizes an RSSI measurement result of each to-be-measured receive beam to obtain a channel occupancy ratio of a channel covered by the to-be-measured receive beam, or the terminal device quantizes a sum of RSSI measurement results of all to-be-measured receive beams to obtain a channel occupancy ratio of a wide channel covered by the to-be-measured receive beams.

The terminal device sends an RSSI measurement report to the base station, where the RSSI measurement report includes the RSSI measurement result and the channel occupancy ratio of the channel covered by the to-be-measured receive beam or the channel occupancy ratio of the wide channel covered by the to-be-measured receive beams.

According to this design, the terminal device may quantize the RSSI measurement result of the to-be-measured receive beam in two quantization manners, and report a final quantization result.

According to a second aspect, an embodiment of this application provides a directional measurement method, and the method is performed by a base station in a communication system. The method includes: The base station sends first measurement configuration information to a terminal device, where the first measurement configuration information is used to indicate a to-be-measured receive beam.

According to the method, the base station may send the first measurement configuration information to the terminal device, to notify the terminal device of the to-be-measured receive beam. In this way, the terminal device may perform RSSI measurement on the to-be-measured receive beam in a targeted manner, and does not need to perform RSSI measurement in all directions. Therefore, in the method, directional RSSI measurement of the terminal device can be implemented, time and power that are consumed by the terminal device to perform RSSI measurement can be reduced, and RSSI measurement efficiency of the terminal device can be improved.

In a possible design, the first measurement configuration information includes a signal index of a downlink reference signal; the first measurement configuration information includes configuration information of an uplink reference signal; or the first measurement configuration information includes an identifier of a transmit beam of the base station.

According to this design, the base station may indicate the to-be-measured receive beam to the terminal device in a plurality of manners.

In a possible design, the base station may further send second measurement configuration information to the terminal device, where the second measurement configuration information is used to indicate an RSSI measurement timing configuration RMTC window.

According to this design, the base station may configure the RMTC window for the terminal device.

In a possible design, the base station may further send RRC signaling to the terminal device, where the RRC signaling includes a correspondence between random access information and a signal index of a downlink reference signal, and/or a correspondence between configuration information of an uplink reference signal and a signal index of a downlink reference signal. For example, in a scenario in which the terminal device uses a contention-based random access manner, a parameter "ssb-perRACH-OccacionAndCB-PreamblesPerSSB" in random access configuration information (RACH-ConfigCommon IE) may indicate the correspondence. For another example, in a scenario in which the terminal device uses a non-contention-based random access manner, a parameter "ssb-perRACH-OccasionAndCB-PreamblesPerSSB" in random access configuration information (RACH-ConfigDedicated IE) may indicate the correspondence. For another example, a parameter "SRS-spatialRelationInfo" in an SRS configuration message (SRS-Config IE) sent by the base station to the terminal device indicates configuration information of an SRS and a signal index of a downlink reference signal that have a same spatial domain transmission filtering feature.

In a possible design, the random access information is a random access time-frequency position, or the random access information is a random access time-frequency position and a random access preamble.

In a possible design, before that the base station sends first measurement configuration information to a terminal device, the method further includes: The base station determines that there is interference on a current downlink receive beam of the terminal device. The base station sends a notification message to the terminal device, where the notification message is used to notify the terminal device to perform received signal strength indication RSSI measurement.

According to this design, when determining that there is interference on the current downlink receive beam of the terminal device, the base station may indicate the terminal device to perform RSSI measurement, so that the terminal device may switch to another downlink receive beam that meets a communication requirement such as low interference.

In a possible design, the base station may determine in, but not limited to, the following manners, that there is interference on the current downlink receive beam of the terminal device.

Manner 1: In a process in which the terminal device receives downlink data through the current downlink receive beam, the base station determines that a first data transmission quality parameter within first specified duration exceeds a specified threshold, or determines that a second data transmission quality parameter within first specified duration is less than a second specified quality threshold.

The base station may determine the first data transmission quality parameter or the second data transmission quality parameter by using a success/failure response message sent by the terminal device for downlink data sending and a parameter such as a block error rate, a bit error rate, a correct transmission block rate, or a correct transmission bit rate.

Manner 2: The base station receives an RSRP measurement report from the terminal device, and determines that an RSRP measurement result included in the RSRP measurement report is less than a second threshold.

In a possible design, the base station may further receive an RSSI measurement report from the terminal device, where the RSSI measurement report includes an RSSI measurement result obtained after the terminal device performs RSSI measurement and a channel occupancy ratio of a channel covered by each to-be-measured receive beam or a channel occupancy ratio of a wide channel covered by to-be-measured receive beams. In this way, the base station may determine, for the terminal device based on content in the RSSI measurement report, a target downlink receive beam whose interference status meets the communication requirement.

In a possible design, after receiving the RSSI measurement report from the terminal device, the base station may determine an interference status of the terminal device in a direction of the to-be-measured receive beam, then determine the target downlink receive beam from the to-be-measured receive beam, and send first beam configuration information to the terminal device, where the first beam configuration information is used to indicate the target downlink receive beam. The terminal device switches the downlink receive beam to the target downlink receive beam after receiving the first beam configuration information.

Optionally, the first beam configuration information may include information that can uniquely identify the target downlink receive beam, such as an identifier (index) of the target downlink receive beam, an identifier of a downlink transmit beam corresponding to the target downlink receive beam, or a signal index of a downlink reference signal of the base station.

In a possible design, after receiving the RSSI measurement report from the terminal device, the base station may determine the interference status of the terminal device in the direction of the to-be-measured receive beam. Then, the base station determines a target downlink transmit beam, and switches a downlink transmit beam of the base station to the target downlink transmit beam. The base station sends second beam configuration information to the terminal device, where the second beam configuration information includes a switching indication used to indicate the terminal device to switch the downlink receive beam.

After receiving the second beam configuration information, the terminal device may adjust a receiver angle based on the switching indication (where for example, when the terminal device uses a data beamforming technology, the receiver angle may be adjusted by adjusting a phase), switch the downlink receive beam to the target downlink receive beam whose interference status meets the communication requirement, and listen to and receive, on the target downlink receive beam, a downlink signal sent by the base station.

Optionally, when the second beam configuration information further includes information that can uniquely identify the target downlink receive beam, such as an identifier (index) of the target downlink receive beam, an identifier of the target downlink transmit beam of the base station, or the signal index of the downlink reference signal of the base station, the terminal device may directly determine the target downlink receive beam based on the information.

According to a third aspect, an embodiment of this application provides a communication apparatus, including a unit configured to perform the step in any one of the foregoing aspects.

According to a fourth aspect, an embodiment of this application provides a communication device, including at least one processing element and at least one storage element. The at least one storage element is configured to store a program and data, and the at least one processing element is configured to perform the method provided in any one of the foregoing aspects of this application.

According to a fifth aspect, an embodiment of this application provides a communication system, including a terminal device and a base station. The terminal device has a function of performing the method provided in the first aspect of this application, and the base station has a function of performing the method provided in the second aspect of this application.

According to a sixth aspect, an embodiment of this application further provides a computer program. When the computer program is run on a computer, the computer is enabled to perform the method provided in any one of the foregoing aspects.

According to a seventh aspect, an embodiment of this application further provides a computer-readable storage medium. The computer-readable storage medium stores a computer program. When the computer program is executed by a computer, the computer is enabled to perform the method provided in any one of the foregoing aspects.

According to an eighth aspect, an embodiment of this application further provides a chip. The chip is configured to read a computer program stored in a memory, to perform the method provided in any one of the foregoing aspects.

According to a ninth aspect, an embodiment of this application further provides a chip system. The chip system includes a processor, configured to support a computer apparatus in implementing the method provided in any one of the foregoing aspects. In a possible design, the chip system further includes a memory, and the memory is configured to store a program and data that are necessary for the computer apparatus. The chip system may include a chip, or may include a chip and another discrete component.

DESCRIPTION OF EMBODIMENTS

Figure 1:
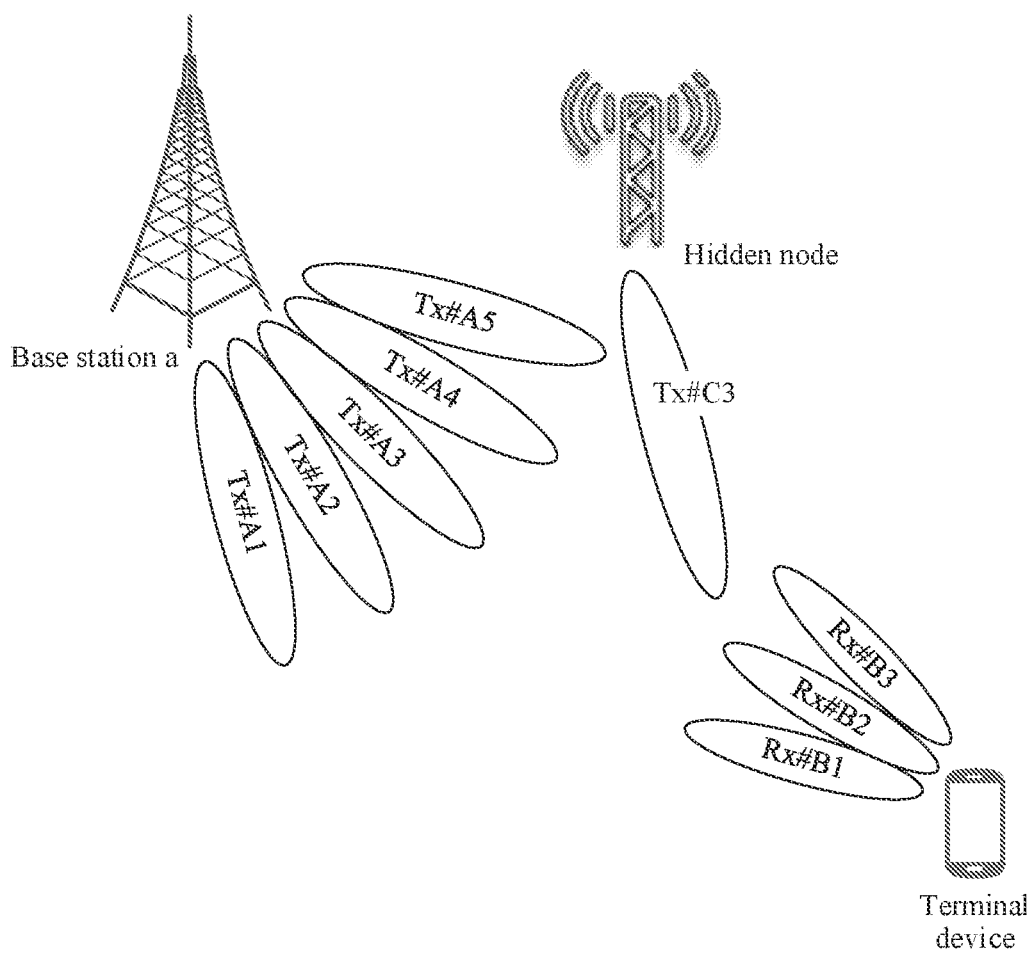
FIG. 1 is a schematic diagram of signal interference in an NRU system in a conventional technology.

This application provides a directional measurement method and a device, to implement directional RSSI measurement in an NRU system. The method and the device are based on a same technical concept. Because a problem-resolving principle of the method is similar to a problem-resolving principle of the device, mutual reference may be made to implementations of the method and the device, and no repeated description is provided.

In the following, some terms in this application are described, to help a person skilled in the art have a better understanding.

(1) A terminal device is a device that provides a voice and/or data connectivity for user. The terminal device may also be referred to as user equipment (user equipment, UE), a mobile station (mobile station, MS), a mobile terminal (mobile terminal, MT), or the like.

For example, the terminal device may be a handheld device, a vehicle-mounted device, or a road side unit that has a wireless connection function. Currently, some examples of the terminal device are a mobile phone (mobile phone), a tablet computer, a notebook computer, a palmtop computer, a mobile internet device (mobile internet device, MID), a point of sale (point of sale, POS), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), various smart instruments (a smart water meter, a smart electricity meter, and a smart gas meter), a vehicle-mounted electronic control unit (electronic control unit, ECU), a vehicle-mounted computer, an in-vehicle cruise system, and a telematics box (telematics box, T-Box).

(2) A base station is a device that connects a terminal device to a wireless network in an NRU system. The network device serving as a node in a radio access network may also be referred to as a network device or a radio access network (radio access network, RAN) node (or device).

Currently, some examples of the network device are a gNB, a transmission reception point (transmission reception point, TRP), an evolved NodeB (evolved NodeB, eNB), a radio network controller (radio network controller, RNC), a NodeB (NodeB, NB), an access point (access point, AP), a base station controller (base station controller, BSC), a base transceiver station (base transceiver station, BTS), a home base station (for example, a home evolved NodeB or a home NodeB, HNB), and a base band unit (base band unit, BBU).

In addition, in a network structure, the base station may include a centralized unit (centralized unit, CU) node and a distributed unit (distributed unit, DU) node. In this structure, protocol layers of the base station are split. Functions of some protocol layers are centrally controlled by the CU, functions of some or all of remaining protocol layers are distributed in the DU, and the CU centrally controls the DU.

(3) The term "and/or" describes an association relationship between associated objects and represents that three relationships may exist. For example, A and/or B may represent the following three cases: Only A exists, both A and B exist, and only B exists. The character "/" usually indicates an "or" relationship between the associated objects.

It should be noted that "a plurality of" used in this application means two or more. "At least one" means one or more.

In addition, it should be understood that in descriptions of this application, terms such as "first" and "second" are merely used for differentiation and description, but should not be understood as an indication or implication of relative importance or an indication or implication of a sequence.

The following describes in detail embodiments of this application with reference to the accompanying drawings.

Figure 2:
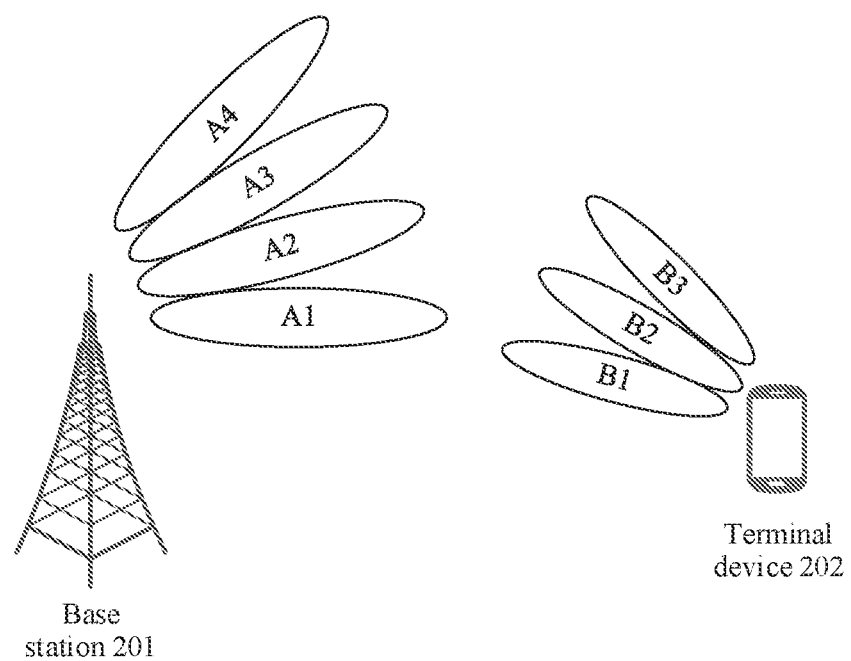
FIG. 2 is a schematic diagram of a communication system according to an embodiment of this application.

FIG. 2 shows a possible architecture of a communication system to which a directional measurement method according to an embodiment of this application is applicable. To improve a capacity of the communication system and relieve pressure of a shortage of licensed spectrum resources, an unlicensed spectrum resource may be used for communication in the communication system. For example, the communication system may work in a high-frequency unlicensed frequency band of about 60 GHz. Refer to FIG. 2. The communication system includes a base station 201 and a terminal device 202.

The base station 201 is an entity that can receive and transmit a wireless signal on a network side, and is responsible for providing a radio access-related service for the terminal device 202 in a cell managed by the base station, and implementing a physical layer function, resource scheduling and radio resource management, quality of service (Quality of Service, QoS) management, radio access control, and mobility management.

The terminal device 202 is an entity that can receive and transmit a wireless signal on a user side, and needs to access a network through the base station 201.

It should be noted that the communication system shown in FIG. 2 is used as an example, and constitutes no limitation on a communication system to which the method according to an embodiment of this application is applicable. Embodiments of this application may be further applied to communication systems of various types and standards, for example, an NRU system, a 5th generation (The 5th Generation, 5G) communication system, a future (6th generation, 7th generation, or the like) communication system, a long term evolution (Long Term Evolution, LTE) communication system, a vehicle-to-everything (vehicle-to-everything, V2X) communication system, a long term evolution-vehicle (LTE-vehicle, LTE-V) communication system, a vehicle-to-vehicle (vehicle-to-vehicle, V2V) communication system, an interact of vehicles communication system, a machine type communication (Machine Type Communications, MTC) communication system, an internet of things (interact of things, to IoT) communication system, a long term evolution-machine to machine (LTE-machine to machine, LTE-M) communication system, a machine to machine (machine to machine, M2M) communication system, and a D2D communication system. This is not limited in embodiments of this application.

In this application, the communication system shown in FIG. 2 supports a beamforming technology. To be specific, the base station 201 and the terminal device 202 may separately manage a plurality of beams. As shown in the figure, beams managed by the base station 201 are A1 to A4, and beams managed by the terminal device 202 are B1 to B3. In a process in which the terminal device 202 accesses the base station 201, the terminal device 202 and the base station 201 need to determine beams used for communication in an uplink direction and a downlink direction. In addition, because mobility of the terminal device 202 and an air interface environment change, subsequently, the terminal device 202 and the base station 201 further need to adjust the beams used in the uplink direction and the downlink direction in real time.

It can be learned from the foregoing descriptions that, in the uplink direction, the terminal device 202 needs to determine an uplink transmit beam from a plurality of managed transmit beams (for example, Tx #B1 to Tx #B3) and the base station 201 needs to determine an uplink receive beam from a plurality of managed receive beams (for example, Rx #A1 to Rx #A4). In the downlink direction, the terminal device 202 needs to determine a downlink receive beam from the plurality of managed receive beams (for example, Rx #B1 to Rx #B3 (in a scenario in which each beam managed by the terminal device 202 may be used for both uplink sending and downlink receiving)) and the base station 201 needs to determine a downlink transmit beam from the plurality of managed receive beams (for example, Tx #A1 to Tx #A4 (in a scenario in which each beam managed by the base station 201 may be used for both uplink receiving and downlink sending)).

It is learned that, during actual application, the communication system shown in FIG. 2 may simultaneously perform signal transmission on a same unlicensed frequency band with a plurality of other systems, and this may cause a channel interference problem. In addition, because the communication system works in a high-frequency unlicensed frequency band, beams used by the base station 201 and the terminal device 202 in the communication system become narrower. As a result, many hidden nodes cause interference to a receive beam of the terminal device 202 in the communication system. Therefore, the terminal device 202 needs to perform interference measurement in a receive beam direction, so that the terminal device 202 can switch a downlink receive beam, to avoid signal interference of a hidden node. Currently, an interference measurement method commonly used in a communication system includes RSSI measurement.

In a conventional RSSI measurement method, the base station 201 configures an RMTC window for the terminal device 202, and measurement time and a measurement frequency band are specified for the RMTC window. In this way, the terminal device 202 performs RSSI measurement on the specified measurement frequency band within the specified measurement time based on the RMTC window sent by the base station, to generate an RSSI measurement result. Finally, the terminal device 202 sends the RSSI measurement result to the base station 201 by using an RSSI measurement report, so that the base station 201 determines a new target downlink receive beam for the terminal device 202 based on the RSSI measurement result.

In addition, the communication system supports a mechanism for simultaneously reporting the RSSI measurement result and a channel occupancy (channel occupancy, CO) ratio. To be specific, after obtaining the RSSI measurement result, the terminal device 202 may obtain the channel occupancy ratio based on the RSSI measurement result. Then, the terminal device 202 simultaneously reports the channel occupancy ratio and the RSSI measurement result to the base station 201 by using the RSSI measurement report. The CO ratio is a ratio of a measured. RSSI the measurement result that is higher than a specified channel occupancy threshold (channelOccupancyThreshold, which is an RSSI threshold used for channel occupancy evaluation).

However, in the conventional RSSI measurement method, the terminal device 202 performs RSSI measurement based on the RMTC window sent by the base station. In addition, only the measurement time and the measurement frequency band are specified for the RMTC window, and the terminal device 202 may need to perform omnidirectional RSSI measurement on all receive beams. Because the terminal device 202 cannot perform directional RSSI measurement in a targeted manner, there are problems such as long time and increased power consumption for the terminal device 202 to perform RSSI measurement.

Figure 3:
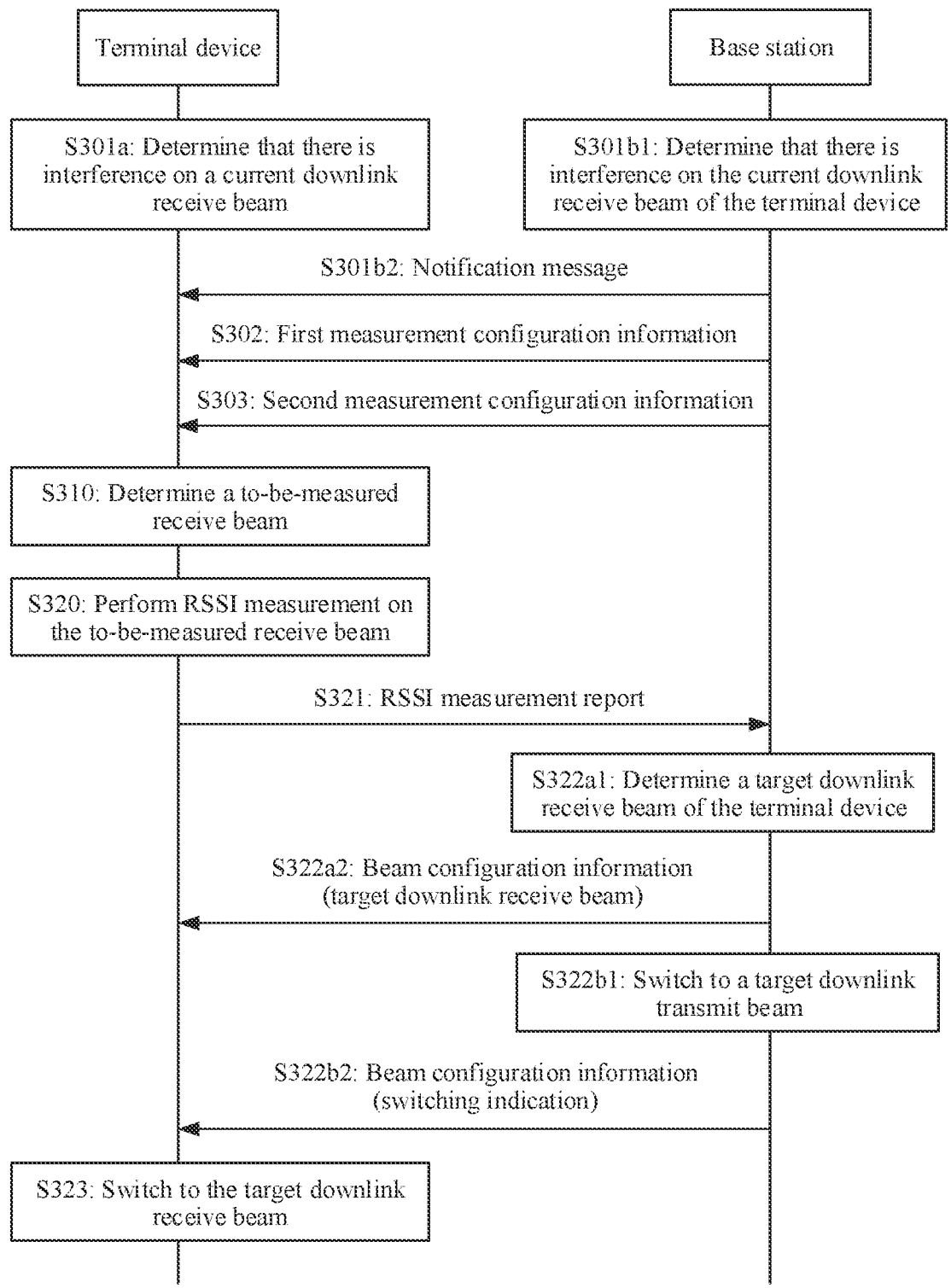
FIG. 3 is a flowchart of a directional measurement method according to an embodiment of this application.

To resolve the foregoing problems, an embodiment of this application provides a directional measurement method. The method is applicable to the communication system shown in FIG. 2. Refer to FIG. 3. The method specifically includes the following procedure.

The following first describes actual execution of directional measurement of a terminal device. In this embodiment of this application, the terminal device may perform a directional measurement process in, but not limited to, the following implementations.

Implementation 1: The terminal device may autonomously determine, by using S301a, to perform the directional measurement process.

S301a: The terminal device determines that there is interference on a current downlink receive beam. Optionally, the terminal device may determine in, but not limited to, the following manners, that there is interference on the current downlink receive beam.

Manner 1: In a process in which the terminal device receives downlink data through the current downlink receive beam, the terminal device determines that a first data transmission quality parameter within first specified duration exceeds a first specified quality threshold, or determines that a second data transmission quality parameter within first specified duration is less than a second specified quality threshold.

For example, the first data transmission quality parameter includes at least one or a combination of the following: a quantity of failure response messages (NACKs) generated for downlink data, a block error rate, a bit error rate, and the like. The second data transmission quality parameter includes at least one or a combination of the following: a quantity of success response messages (ACKs) generated for downlink data, a correct transmission block rate, a correct transmission bit rate, and the like.

Manner 2: After performing RSRP measurement on the current downlink receive beam, the terminal device determines that an RSRP measurement result is less than an RSRP threshold.

Implementation 2: As shown in S301b1 and S301b2 in the figure, the terminal device performs the directional measurement process after receiving a notification or an indication of a base station.

S301b1: The base station accessed by the terminal device determines that there is interference on the current downlink receive beam of the terminal device.

For example, the base station may alternatively determine, in the following two manners, that there is interference on the current downlink receive beam of the terminal device.

Manner 1: In a process in which the terminal device receives downlink data through the current downlink receive beam, the base station determines that a first data transmission quality parameter within first specified duration exceeds a specified threshold, or determines that a second data transmission quality parameter within first specified duration is less than a second specified quality threshold.

The base station may determine the first data transmission quality parameter or the second data transmission quality parameter by using a success/failure response message sent by the terminal device for downlink data sending and a parameter such as a block error rate, a bit error rate, a correct transmission block rate, or a correct transmission bit rate.

Manner 2: The base station receives an RSRP measurement report from the terminal device, and determines that an RSRP measurement result included in the RSRP measurement report is less than a second threshold.

S301b2: The base station sends a notification message to the terminal device, where the notification message is used to notify the terminal device to perform RSSI measurement.

It should be noted that, in the implementation 1, after determining that there is interference on the current downlink receive beam, the terminal device may send a notification message to the base station, to request the base station to perform measurement configuration for the terminal device. After receiving the notification message, the base station may send first measurement configuration information and/or second measurement configuration information to the terminal device.

In addition, in the implementation 2, S301b2 is an optional step. The base station may directly notify the terminal device to perform RSSI measurement by directly sending the first measurement configuration information and/or the second measurement configuration information without sending the notification message.

S302: The base station sends the first measurement configuration information to the terminal device, where the first measurement configuration information is used to indicate a to-be-measured beam. Optionally, the first measurement configuration information may be carried in RRC signaling.

S303: The base station sends the second measurement configuration information to the terminal device, where the second measurement configuration information is used to indicate an RSSI measurement timing configuration RMTC window. Optionally, the second measurement configuration information may be carried in RRC signaling.

It should be noted that both S302 and S303 are optional steps, and the base station may not perform S302 or S303, the base station performs either of the foregoing steps, or the base station performs the foregoing two steps. It should be further noted that, when the base station performs the foregoing two steps, the first measurement configuration information and the second measurement configuration information may be carried in a same message for sending. For example, the first measurement configuration information and the second measurement configuration information are carried in same RRC signaling. In addition, time and a sequence of performing steps S302 and S303 are not limited in this embodiment of this application either. For example, the second measurement configuration information and/or the second measurement configuration information may be periodically sent by the base station, sent when the terminal device accesses the base station, or sent at another specified moment.

S310: The terminal device determines the to-be-measured receive beam from a plurality of managed receive beams.

Optionally, the terminal device may autonomously determine the to-be-measured receive beam, or the terminal device may determine the to-be-measured receive beam based on an indication of the base station (for example, when the base station sends the first measurement configuration information by using S302).

Implementation 1: The terminal device may autonomously determine the to-be-measured receive beam, which specifically includes the following steps.

A1: The terminal device determines a first transmit beam, where the first transmit beam is a transmit beam used by the base station.

A2: The terminal device determines a first receive beam based on a correspondence between a transmit beam of the base station and a receive beam of the terminal device, where the first receive beam is a receive beam, of the terminal device, corresponding to the first transmit beam.

A3: The terminal device determines that the to-be-measured receive beam is the first receive beam.

The terminal device may store the correspondence between the transmit beam of the base station and the receive beam of the terminal device.

It is learned that the base station usually sends different downlink reference signals (downlink reference signals, DL-RSs) through different transmit beams (where different downlink reference signals have different signal indexes (indexes/IDs)), and different downlink reference signals exist in a time division multiplexing (time division multiplexing, TDM) manner. In other words, indexes of downlink reference signals are in a one-to-one correspondence with transmit beams of the base station in a direction. Optionally, the downlink reference signal may be a synchronization signal block (synchronization signal block, SSB) or a channel state information reference signal (channel state information-reference signal, CSI-RS). A signal index of the SSB is an SSB index, and a signal index of the CSI-RS may be a CSI-RS ID.

The terminal device may determine the first transmit beam by using the following steps.

a1: The terminal device obtains a signal index of a first downlink reference signal, where the first downlink reference signal is a downlink reference signal sent by the base station.

a2: The terminal device determines, based on a correspondence between a signal index of a downlink reference signal and a transmit beam of the base station, the first transmit beam corresponding to the signal index of the first downlink reference signal.

In this embodiment of this application, when performing a1, the terminal device may obtain the signal index of the first downlink reference signal in, but not limited to, the following manners.

Manner 1: The terminal device receives system information from the base station, and obtains the signal index of the first downlink reference signal from the system information.

For example, after receiving a master information block (master information block, MIB) in the system information sent by the base station, the terminal device may obtain an SSB index included in the MIB by demodulating the MIR The MIB usually includes a plurality of SSB indexes.

Manner 2: The terminal device determines first random access information, where the first random access information is used by the terminal device to perform random access, and determines, based on a correspondence between random access information and a signal index of a downlink reference signal, the signal index, of the first downlink reference signal, corresponding to the first random access information.

Optionally, the correspondence between the random access information and the signal index of the downlink reference signal may be carried in RRC signaling, and the base station sends the RRC signaling to the terminal device.

In the implementation 1, in a scenario in which the terminal device uses a contention-based random access manner, ssb-perRACH-Occasion in a parameter "ssb-perRACH OccasionAndCB-PreamblesPerSSB" in random access configuration information (RACH-ConfigCommon IE) sent by the base station indicates a correspondence between an SSB and a random access occasion (RACH occasion, RO), and CB-PreamblesPerSSB indicates a correspondence between an SSB and a random access preamble (preamble) in an RO. Therefore, the terminal device may obtain the correspondence between the random access information and the signal index of the downlink reference signal from the random access configuration information.

In the implementation 2, in a scenario in which the terminal device uses a non-contention-based random access manner, a parameter "ssb-perRACH-OccasionAndCB-PreamblesPerSSB" in random access configuration information (RACH-ConfigDedicated IE) sent by the base station indicates a correspondence between an SSB and a random access occasion (RACH occasion, RO) (optionally, further including a random access preamble (preamble)). Therefore, the terminal device may obtain the correspondence between the random access information and the signal index of the downlink reference signal from the random access configuration information.

It should be noted that, in any one of the foregoing implementations, optionally, there is a one-to-one correspondence between an SSB and a random access occasion (RACH occasion, RO), a one-to-many correspondence between an SSB and random access occasions (RACH occasions, ROs), and a many-to-one correspondence between SSBs and a random access occasion (RACH occasion, RO), for example, oneEighth, oneFourth, one Half, one, and two. The random access occasion RO includes a position of a time-frequency resource used when the terminal device performs random access. Therefore, the RO may also be referred to as a random access time-frequency position.

Figure 4A:
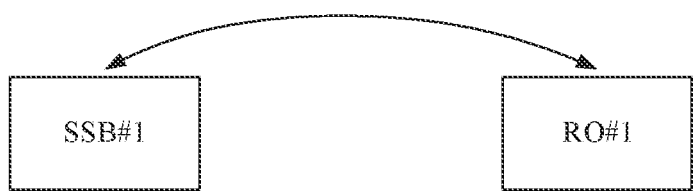
FIG. 4A is a schematic diagram of a correspondence between an SSB and an RO according to an embodiment of this application.
Figure 4A:
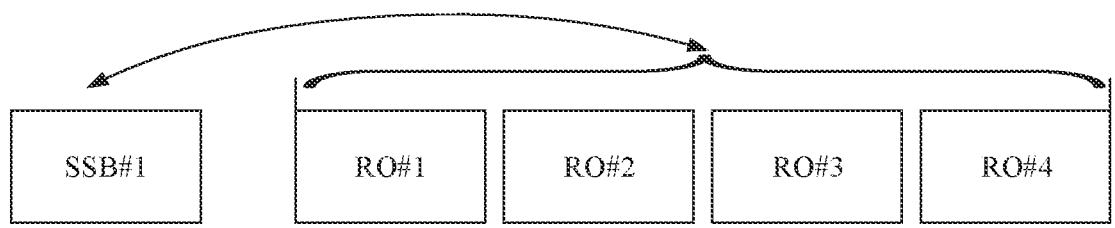

In a first example, for the one-to-one correspondence between the SSB and the random access occasion (RACH occasions, RO) or the one-to-many correspondence between the SSB and the random access occasions (RACH occasions, ROs), the terminal device may directly determine the signal index (a first SSB index) of the first downlink reference signal based on the first random access information (the RO) used by the terminal device to perform random access. Refer to FIG. 4A. When there is the one-to-one relationship between the SSB and the RO or the one-to-many relationship between the SSB and the ROs, the terminal device may determine, based on an RO #1 currently used by the terminal device for random access, that a corresponding SSB index is an SSB #1.

Figure 4B:
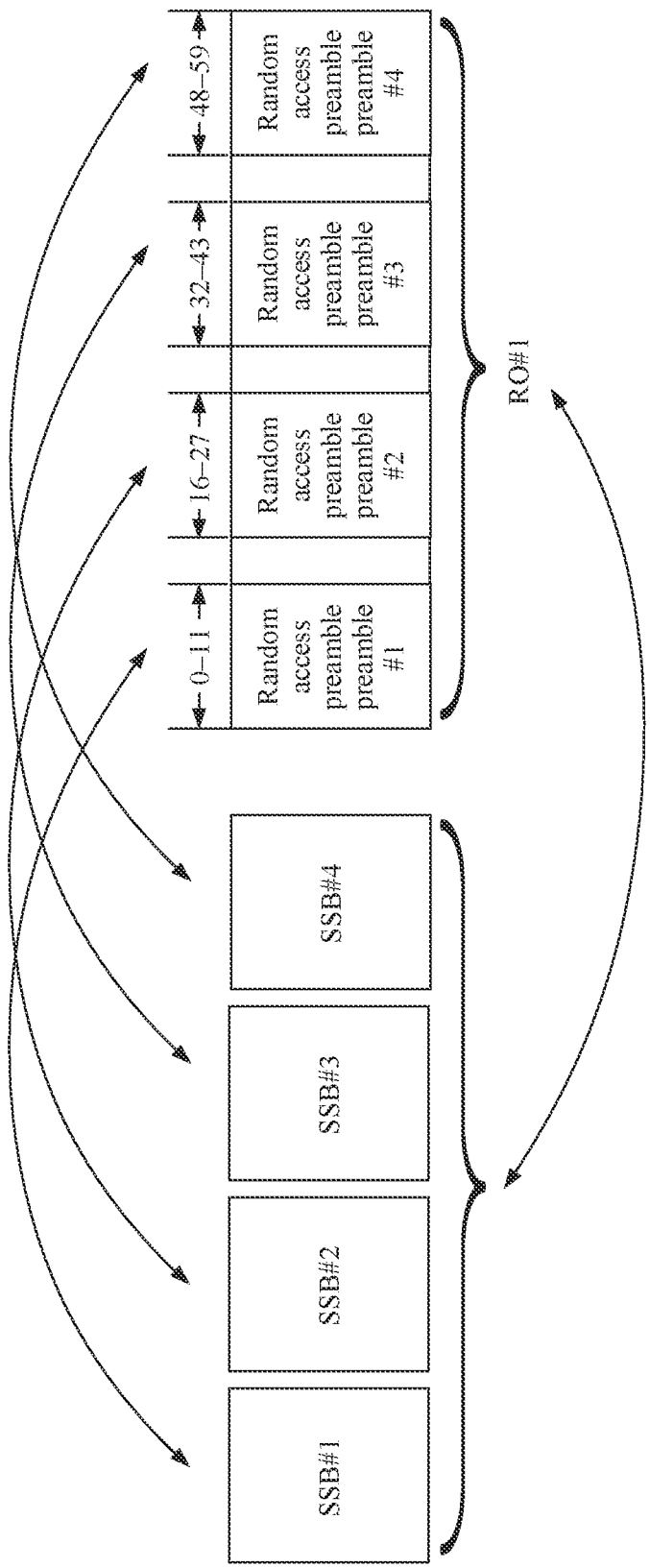
FIG. 4B is a schematic diagram of a correspondence between an SSB and an RO/a preamble according to an embodiment of this application.

In a second example, for the many-to-one relationship between the SSBs and the random access occasion (RACH occasion, RO), the terminal device may determine the signal index (a first SSB index) of the first downlink reference signal based on the first random access information (the RO and the random access preamble) used by the terminal device to perform random access. For example, when ssb-perRACH-Occasion="oneFourth" and CB-PreamblesPerSSB=n60 in the parameter ssb-perRACH-OccasionAndCB-PreamblesPerSSB, the correspondence between the SSB and the RO or the preamble is that shown in FIG. 4B, and the terminal device may determine, based on an RO #1 and a preamble #1 that are currently used for random access, that a corresponding SSB index is an SSB #1.

In conclusion, when the parameter ssb-perRACH-OccasionAndCB-PreamblesPerSSB indicates the one-to-one relationship between the SSB and the RO or the one-to-many relationship between the SSB and the ROs, the random access information in the correspondence between the random access information and the signal index of the downlink reference signal is the RO, and the first random access information that is determined by the terminal device and that is used by the terminal device to perform random access is the RO used by the terminal device to perform random access. When the parameter ssb-perRACH-OccasionAndCB-PreamblesPerSSB indicates the many-to-one relationship between the SSBs and the RO, the random access information in the correspondence between the random access information and the signal index of the downlink reference signal is the RO and the preamble, and the first random access information that is determined by the terminal device and that is used by the terminal device to perform random access is the RO and the preamble that are used by the terminal device to perform random access.

Manner 3: The terminal device determines configuration information of a first uplink reference signal, where the first uplink reference signal is an uplink reference signal sent by the terminal device to the base station. The terminal device determines, based on a correspondence between configuration information of an uplink reference signal and a signal index of a downlink reference signal, the signal index, of the first downlink reference signal, corresponding to the configuration information of the first uplink reference signal.

Optionally, the correspondence between the configuration information of the uplink reference signal and the signal index of the downlink reference signal is carried in RRC signaling.

For example, the uplink reference signal (uplink reference signal, UL-RS) may be an uplink sounding reference signal (sounding reference signal, SRS).

In an implementation, a parameter "SRS-spatialRelationInfo" in an SRS configuration message (SRS-Config IE) sent by the base station to the terminal device indicates configuration information of an SRS and a signal index of a downlink reference signal that have a same spatial domain transmission filtering feature. In this embodiment of this application, the downlink reference signal having the same spatial domain transmission filtering feature as the SRS is used as the downlink reference signal corresponding to the SRS. Therefore, in this embodiment of this application, the terminal device may obtain the correspondence between the configuration information of the uplink reference signal and the signal index of the downlink reference signal from "SRS-spatialRelationInfo". For example, a configuration of "SRS-spatialRelationInfo" is that shown in FIG. 5, where the first block shows the signal index (the SSB index and the CSI-RS index) of the downlink reference signal, and a resource identifier (Resource ID) of the SRS and an uplink bandwidth part (uplink BWP) in the second block are configuration information of the SRS.

In addition, it should be noted that in this implementation, the base station may newly add, to a usage (usage) parameter in SRS resource set information (SRS-ResourceSet IE) of SRS-Config IE, the following usage used to indicate that the terminal device may be configured to perform RSSI measurement on a to-be-measured receive beam, where the usage is shown below:

usage ENUMERATED {beamManagement, codebook, nonCodebook, antennaSwitching, beamRMTC}.

Figure 5:
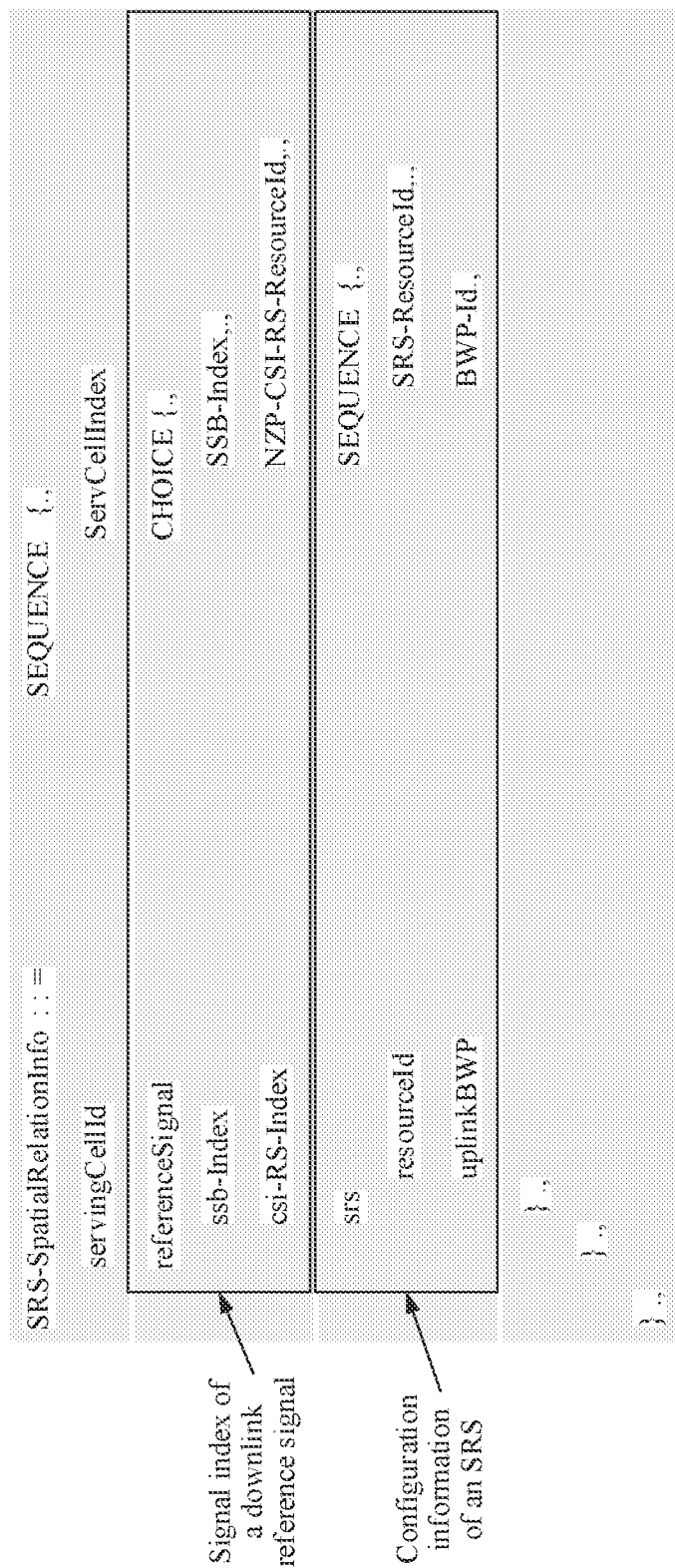
FIG. 5 is a schematic diagram of a parameter configuration including a correspondence between configuration information of an SRS and a signal index of a downlink reference signal according to an embodiment of this application.

It can be learned from the foregoing usage that the SRS configured in the configuration information of the SRS shown in FIG. 5 may be used for conventional beam management (beamManagement), a codebook (codebook), a noncodebook (nonCodebook), and antenna switching (antennaSwitching), and in addition, a new parameter, namely, beamRMTC needs to be defined to indicate that the terminal device may determine a to-be-measured receive beam by using the SRS and perform RSSI measurement on the determined to-be-measured receive beam.

Implementation 2: The terminal device may determine the to-be-measured receive beam based on an indication of the base station. To be specific, when the base station performs S302, the terminal device may determine the to-be-measured receive beam by using the following steps.

B1: The terminal device receives the first measurement configuration information from the base station, where the first measurement configuration information is used to indicate the to-be-measured beam.

B2: The terminal device determines the to-be-measured receive beam based on the first measurement configuration information.

In this implementation, the base station may indicate the to-be-measured beam in a plurality of manners, which may include but are not limited to the following manners.

Manner 1: The first measurement configuration information includes a signal index of a second downlink reference signal.

In the manner 1, that the terminal device determines the to-be-measured receive beam based on the first measurement configuration information includes:

The terminal device obtains the signal index of the second downlink reference signal included in the first measurement configuration information.

The terminal device determines a second transmit beam based on a correspondence between a signal index of a downlink reference signal and a transmit beam of the base station, where the second transmit beam is a transmit beam, of the base station, corresponding to the signal index of the second downlink reference signal.

The terminal device determines a second receive beam based on a correspondence between a transmit beam of the base station and a receive beam of the terminal device, where the second receive beam is a receive beam, of the terminal device, corresponding to the second transmit beam.

The terminal device determines that the to-be-measured receive beam is the second receive beam.

Manner 2: The first measurement configuration information includes configuration information of a second uplink reference signal.

In the manner 2, the terminal device may determine the to-be-measured receive beam based on the first measurement configuration information in, but not limited to, the following implementations.

Implementation 1:

The terminal device obtains the configuration information of the second uplink reference signal included in the first measurement configuration information.

The terminal device determines a third transmit beam based on the configuration information of the second uplink reference signal, where the third transmit beam is a transmit beam used by the terminal device to send the second uplink reference signal.

The terminal device determines a third receive beam of the terminal device based on the third transmit beam of the terminal device, where a configuration of the third receive beam is the same as that of the third transmit beam.

The terminal device determines that the to-be-measured receive beam is the third receive beam.

In the implementation 1, the terminal device may determine, by using channel reciprocity, to use a beam used to send an uplink reference signal specified by the base station as the to-be-measured receive beam.

Implementation 2:

The terminal device obtains the configuration information of the second uplink reference signal included in the first measurement configuration information.

The terminal device determines, based on a correspondence between configuration information of an uplink reference signal and a signal index of a downlink reference signal, the signal index, of the second downlink reference signal, corresponding to the configuration information of the second uplink reference signal.

The terminal device determines a fourth transmit beam based on a correspondence between a signal index of a downlink reference signal and a transmit beam of the base station, where the fourth transmit beam is a transmit beam, of the base station, corresponding to the index of the second downlink reference signal.

The terminal device determines a fourth receive beam based on a correspondence between a transmit beam of the base station and a receive beam of the terminal device, where the fourth receive beam is a receive beam, of the terminal device, corresponding to the fourth transmit beam, and determines that the to-be-measured receive beam is the fourth transmit beam.

For descriptions of the correspondence between the configuration information of the uplink reference signal and the signal index of the downlink reference signal in the implementation 2, refer to the descriptions of the correspondence in the manner 3 of obtaining the signal index of the first downlink reference signal in the implementation 1. Details are not described herein again.

Manner 3: The first measurement configuration information includes an identifier of a fifth transmit beam of the base station.

In the manner 3, that the terminal device determines the to-be-measured receive beam based on the first measurement configuration information includes:

The terminal device obtains the identifier of the fifth transmit beam included in the first measurement configuration information.

The terminal device determines an identifier of a fifth receive beam based on a correspondence between an identifier of a transmit beam of the base station and an identifier of a receive beam of the terminal device, where the identifier of the fifth receive beam is an identifier, of a receive beam of the terminal device, corresponding to the identifier of the fifth transmit beam.

The terminal device determines that the to-be-measured receive beam is the fifth receive beam.

In this manner, the base station may indicate the to-be-measured receive beam to the terminal device by sending the identifier of the transmit beam of the base station to the terminal device.

In addition, in this embodiment of this application, considering that a communication system working in a high-frequency unlicensed frequency band may use a digital beamforming (Beamforming) or a digital-analog hybrid beamforming technology, a concept of a beam index (beam index) is defined in this embodiment of this application and the beam index refers to different beam directions of a transceiver.

For example, in this embodiment of this application, the beam index may be defined in the following manners.

Manner 1: The beam index is defined by using an index/ID of a related. DL-RS or UL-RS (a DL-RS or a UL RS that needs to be sent through a beam). The DL-RS may be an SSB, or may be a CSI-RS. The UL-RS may be an SRS or a newly defined RS.

Manner 2: The beam index is defined based on a beam direction. This definition manner is actually an implementation behavior of the terminal device or the base station. To be specific, the terminal device or the base station may define different transmit beam indexes and receive beam indexes by setting an angle of departure of a transmit beam or an angle of arrival of a receive beam.

In conclusion, in this embodiment of this application, beams of the base station and the terminal device may have indexes (beam indexes). The base station and the terminal device may identify and recognize the beam by using the beam index.

S320: The terminal device performs RSSI measurement on the to-be-measured receive beam.

In an implementation, that is, when the base station performs S303, the terminal device may perform RSSI measurement by using the following steps.

The terminal device receives the second measurement configuration information from the base station, where the second measurement configuration information is used to indicate the RSSI measurement timing configuration RMTC window.

The terminal device performs RSSI measurement on the to-be-measured receive beam in the RMTC window.

In this embodiment of this application, the base station may send the second measurement configuration information through a transmit beam for sending a downlink reference signal. The RMTC window is a time-frequency position at which the terminal device performs RSSI measurement, and the measurement time, the measurement frequency band, and other content are specified for the RMTC window.

In an implementation, the second measurement configuration information may be sent to the terminal device by using higher layer signaling, for example, RRC signaling. For example, the base station may include the second measurement configuration information in measurement object information (measObjectNR IE). In other words, measObjectNR IE includes the following configuration parameters of the RMTC window:

a measurement periodicity: periodicity, (for example, 40/80/160/320/640 ms);

measurement duration: measurement duration;

an offset of RMTC measurement duration: offset of RMTC measurement duration;

a measurement bandwidth: measurement bandwidth; and measurement absolute radio frequency channel number (Absolute Radio Frequency Channel Number, ARFCN) for inter-frequency measurements: measurement ARFCN for inter-frequency measurements.

Usually, one receive beam of the terminal device covers one channel, and a channel bandwidth of each channel may be an LBT bandwidth. Therefore, a channel covered by the to-be-measured receive beam determined by the terminal device is included in the measurement bandwidth specified for the RMTC window.

It can be learned from the foregoing descriptions of the RMTC window that the terminal device performs, within the time specified for the RMTC window on the to-be-measured receive beam, RSSI measurement on the channel specified for the RMTC window.

S321: The terminal device obtains an RSSI measurement result of the to-be-measured receive beam, and sends an RSSI measurement report to the base station, where the RSSI measurement report includes the RSSI measurement result.

Optionally, in this embodiment of this application, the communication system supports a mechanism for simultaneously reporting the RSSI measurement result and a CO ratio.

In an implementation, when the terminal device determines one to-be-measured receive beam, the RMTC window configured by the base station for the terminal device includes one LBT bandwidth.

In this implementation, after performing RSSI measurement, the terminal device obtains the RSSI measurement result of the to-be-measured receive beam. Then, the terminal device may quantize the RSSI measurement result, to obtain a channel occupancy ratio of the channel covered by the to-be-measured receive beam. The terminal device also includes the obtained channel occupancy ratio of the channel covered by the to-be-measured receive beam in the RSSI measurement report and sends the RSSI measurement report to the base station.

In another implementation, when the terminal device determines a plurality of to-be-measured receive beams, the RMTC window configured by the base station for the terminal device may include the following two manners.

Manner 1: The base station configures one RMTC window for the terminal device, where the RMTC window is a wide frequency domain measurement window that is based on an LBT bandwidth in frequency domain. To be specific, the measurement bandwidth indicated by the RMTC window includes channels (a plurality of LBT bandwidths) covered by a plurality of to-be-measured receive beams.

In this manner, after performing RSSI measurement, the terminal device obtains an RSSI measurement result of each to-be-measured receive beam. When the terminal device quantizes the RSSI measurement result, the following two quantization manners are supported.

Quantization manner 1: The terminal device may quantize the RSSI measurement result of each to-be-measured receive beam, to obtain a channel occupancy ratio of a channel covered by the to-be-measured receive beam. The terminal device also includes the obtained channel occupancy ratio of the channel covered by the to-be-measured receive beam in the RSSI measurement report and sends the RSSI measurement report to the base station.

Quantization manner 2: The terminal device may quantize a sum of RSSI measurement results of all to-be-measured receive beams, to obtain a channel occupancy ratio of a wide channel covered by the to-be-measured receive beams. The terminal device also includes the obtained channel occupancy ratio of the wide channel covered by the to-be-measured receive beams in the RSSI measurement report and sends the RSSI measurement report to the base station.

Figure 6A:
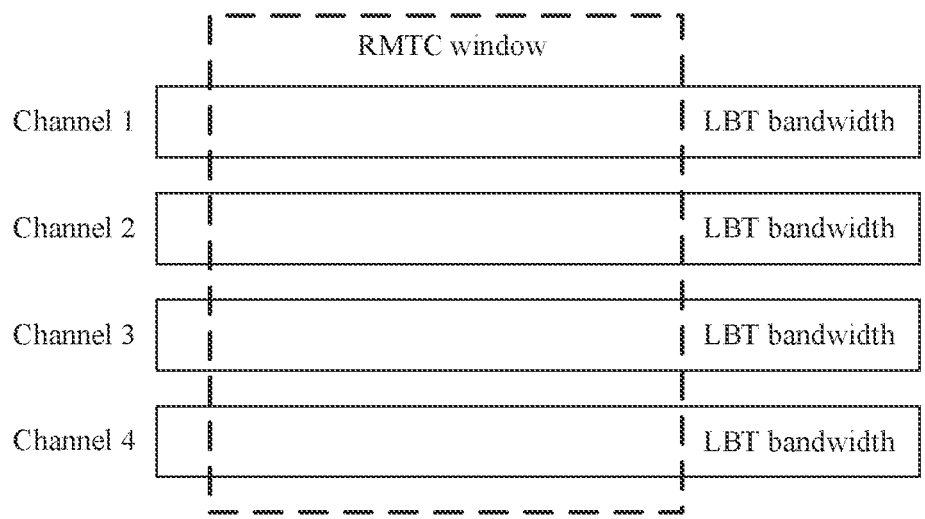
FIG. 6A is a schematic diagram of an RMTC window according to an embodiment of this application.

For example, with reference to FIG. 6A, the RMTC window configured for RSSI measurement by the base station for the terminal device spans four LBT bandwidths in frequency domain. The terminal device performs RSSI measurement on each LBT bandwidth in the configured RMTC window (an area drawn by a dashed line in the figure), to obtain RSSI measurement results of four channels. When the terminal device quantizes the RSSI measurement results, two manners are supported. In one manner, the RSSI measurement results are quantized based on the LBT bandwidth. In the other manner, the RSSI measurement results are quantized based on a wide frequency domain in which the RMTC window is located.

In the quantization manner 1, the terminal device separately performs quantization on a channel 1, a channel 2, a channel 3, and a channel 4, to obtain a channel occupancy ratio of each channel (a quantization result), and then reports the quantization result and information including a channel index to the base station. In this case, the quantization result reported to the base station may be four RSSI measurement results and channel occupancy ratios of the four channels. The channel index herein may be obtained through calculation based on frequency information, or may be obtained based on a related reference signal ID.

In the quantization manner 2, the terminal device quantizes a sum of RSSI measurement results obtained on the channel 1 to the channel 4, to obtain a channel occupancy ratio of one wide channel including the channel 1 to the channel 4.

Manner 2: The base station configures a plurality of RMTC windows for the terminal device, where each RMTC window is a measurement window that is based on an LBT bandwidth in frequency domain. To be specific, a measurement bandwidth indicated by each RMTC window includes a channel (one LBT bandwidth) covered by one to-be-measured receive beam.

In this manner, after performing RSSI measurement, the terminal device obtains an RSSI measurement result of each to-be-measured receive beam. The terminal device may quantize the RSSI measurement result of the to-be-measured receive beam, to obtain a channel occupancy ratio of a channel covered by the to-be-measured receive beam. The terminal device also includes the obtained channel occupancy ratio of the channel covered by the to-be-measured receive beam in the RSSI measurement report and sends the RSSI measurement report to the base station.

Figure 6B:
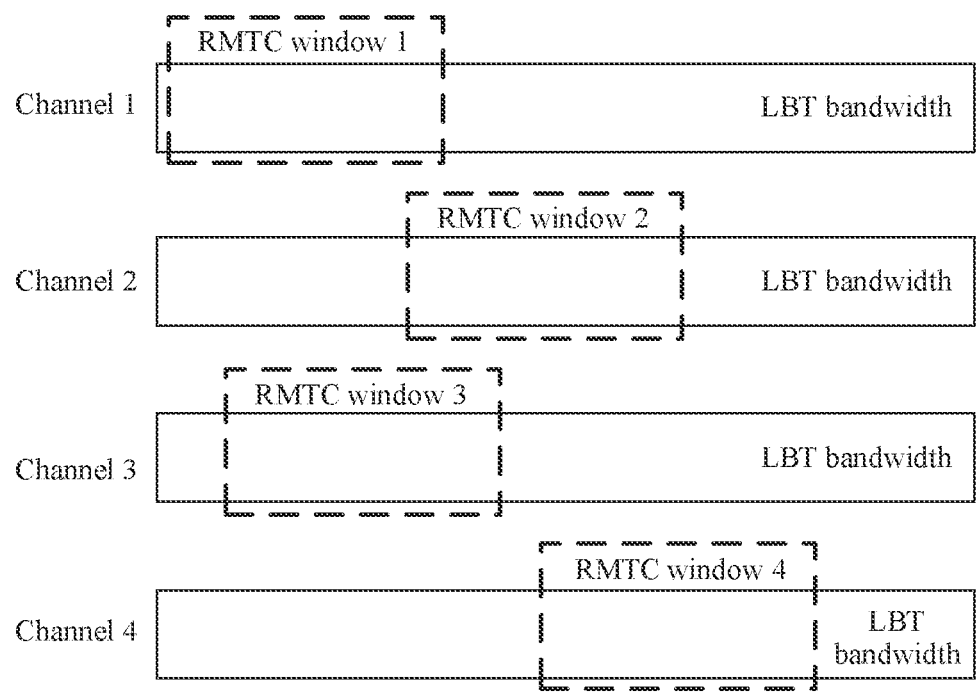
FIG. 6B is a schematic diagram of another RMTC window according to an embodiment of this application.

For example, with reference to FIG. 6B, the base station configures, for the terminal device, four RMTC windows used for RSSI measurement, and each RMTC window corresponds to one LBT bandwidth in frequency domain. The terminal device performs RSSI measurement on each corresponding LBT bandwidth in each RMTC window (an area drawn by a dashed line in the figure), to obtain RSSI measurement results of four channels. Then, the terminal device separately performs quantization on a channel 1, a channel 2, a channel 3, and a channel 4, to obtain a channel occupancy ratio of each channel (a quantization result), and then reports the quantization result and information including a channel index to the base station. In this case, the quantization result reported to the base station may be four RSSI measurement results and channel occupancy ratios of the four channels. The channel index herein may be obtained through calculation based on frequency information, or may be obtained based on a related reference signal ID.

In this embodiment of this application, the terminal device may store the RSSI measurement result into measObjectNR IE, and then report the RSSI measurement result to the base station by using a measurement report reportConfig.

By using the foregoing steps, the terminal device may perform RSSI measurement on a to-be-received beam in a specific direction, to finally implement directional RSSI measurement. In addition, the base station may switch a downlink receive beam of the terminal device by using the following two solutions. Steps S322a1 and S322a2 shown in FIG. 3 are a solution 1, and steps S322b1 and S322b2 are a solution 2. The following separately describes each step in each solution.

Solution 1:

S322a1: After receiving the RSSI measurement report from the terminal device, the base station may determine an interference status of the terminal device in a direction of the to-be-measured receive beam, and then determine a target downlink receive beam from the to-be-measured receive beam.

The target downlink receive beam is a receive beam whose interference status can meet a communication requirement. The communication requirement may include that the RSSI measurement result is greater than or equal to a specified RSSI threshold, and/or a channel occupancy ratio of a covered channel is greater than or equal to a specified channel occupancy ratio threshold, and the like.

S322a2: The base station sends first beam configuration information to the terminal device, where the first beam configuration information is used to indicate the target downlink receive beam. S323: The terminal device switches the downlink receive beam to the target downlink receive beam after receiving the first beam configuration information.

Optionally, the first beam configuration information may include information that can uniquely identify the target downlink receive beam, such as an identifier (index) of the target downlink receive beam, an identifier of a downlink transmit beam corresponding to the target downlink receive beam, or a signal index of a downlink reference signal of the base station.

Solution 2:

S322b1: After receiving the RSSI measurement report from the terminal device, the base station may determine an interference status of the terminal device in a direction of the to-be-measured receive beam. Then, the base station determines a target downlink transmit beam and switches a downlink transmit beam of the base station to the target downlink transmit beam.

Optionally, the base station may first determine the target downlink receive beam whose interference status meets the communication requirement, and then determine, based on a correspondence between a transmit beam of the base station and a receive beam of the terminal device, the target downlink transmit beam corresponding to the target downlink receive beam.

S322b2: The base station sends second beam configuration information to the terminal device, where the second beam configuration information includes a switching indication used to indicate the terminal device to switch the downlink receive beam.

After receiving the second beam configuration information, the terminal device may adjust a receiver angle based on the switching indication (where for example, when the terminal device uses a data beamforming technology, the receiver angle may be adjusted by adjusting a phase), switch the downlink receive beam to the target downlink receive beam whose interference status meets the communication requirement, and listen to and receive, on the target downlink receive beam, a downlink signal sent by the base station.

Optionally, when the second beam configuration information further includes information that can uniquely identify the target downlink receive beam, such as an identifier (index) of the target downlink receive beam, an identifier of the target downlink transmit beam of the base station, or the signal index of the downlink reference signal of the base station, the terminal device may directly determine the target downlink receive beam based on the information.

In an implementation of this embodiment of this application, both the second measurement configuration information and the correspondence between the random access information and the signal index of the downlink reference signal may be carried in RRC signaling, and the base station sends the RRC signaling to the terminal device.

For example, measObjectNR IE sent by the base station includes both the configuration parameters of the RMTC window and configuration information of a measurement receive beam. The configuration parameters of the RMTC window are as follows:

1. a measurement periodicity: periodicity, (for example, 40/80/160/320/640 ms);
2. measurement duration: measurement duration;
3. an offset of RMTC measurement duration: offset of RMTC measurement duration;
4. a measurement bandwidth: measurement bandwidth;
5. measurement absolute radio frequency channel number (Absolute Radio Frequency Channel Number, ARFCN) for inter-frequency measurements: measurement ARFCN for inter-frequency measurements; and
6. configuration information of a measurement receive beam: MeasureRxBeam (ssb-perRACH-Occasion/ssb-perRACH-OccasionAndCB-PreamblesPerSSB).

Optionally, in this implementation, a parameter setting: "ssb-perRACH-Occasion" of beam failure recovery (beam failure recovery, BFR) in R15 may be reused for "ssb-perRACH-Occasion" in the configuration information of the measurement receive beam. This parameter specifies the mapping relationship between the SSB and the RO.

Optionally, in this implementation, a parameter setting: "RACH-ConfigCommon→ssb-perRACH-OccasionAndCB-PreamblesPerSSB" of a PRACH in R15 may be reused for "ssb-perRACH-OccasionAndCB-PreamblesPerSSB" in the configuration information of the measurement receive beam. This parameter specifies the mapping relationship between the SSB and the RO/preamble.

In another implementation of this embodiment of this application, both the second measurement configuration information and the first measurement configuration information may be carried in RRC signaling, and the base station sends the RRC signaling to the terminal device.

For example, measObjectNR IE sent by the base station includes both the configuration parameters of the RMTC window and configuration information used to determine the to-be-measured receive beam. The configuration parameters of the RMTC window are as follows:

1. a measurement periodicity: periodicity, (for example, 40/80/160/320/640 ms);
2. measurement duration: measurement duration;
3. an offset of RMTC measurement duration: offset of RMTC measurement duration;
4. a measurement bandwidth: measurement bandwidth;

5. measurement absolute radio frequency channel number (Absolute Radio Frequency Channel Number, ARFCN) for inter-frequency measurements: measurement ARFCN for inter-frequency measurements; and
6. configuration information of a measurement receive beam: MeasureRxBeam (signal index list (candidate-BeamRSList) of a downlink reference signal of the base station).

Optionally, in this implementation, a parameter setting: "candidateBeamRSList" of BFR in R15 may be reused for "candidateBeamRSList" in the configuration information of the measurement receive beam. This parameter includes a signal index list, of a downlink reference signal SSB or CSI-RS, indicated by the base station.

Optionally, in this implementation, the configuration information of the measurement receive beam may further include configuration information, of an uplink reference signal (for example, an SRS) of the terminal device, specified by the base station, an identifier/index list, of a transmit beam, specified by the base station, or the like.

An embodiment of this application provides a directional measurement method. In the method, a terminal device may determine a to-be-measured receive beam, and perform RSSI measurement on the to-be-measured receive beam. According to the method, the terminal device may perform RSSI measurement on the to-be-measured receive beam in a targeted manner, and does not need to perform RSSI measurement in all directions. Therefore, in the method, directional RSSI measurement of the terminal device can be implemented, time and power that are consumed by the terminal device to perform RSSI measurement can be reduced, and RSSI measurement efficiency of the terminal device can be improved.

Figure 7:
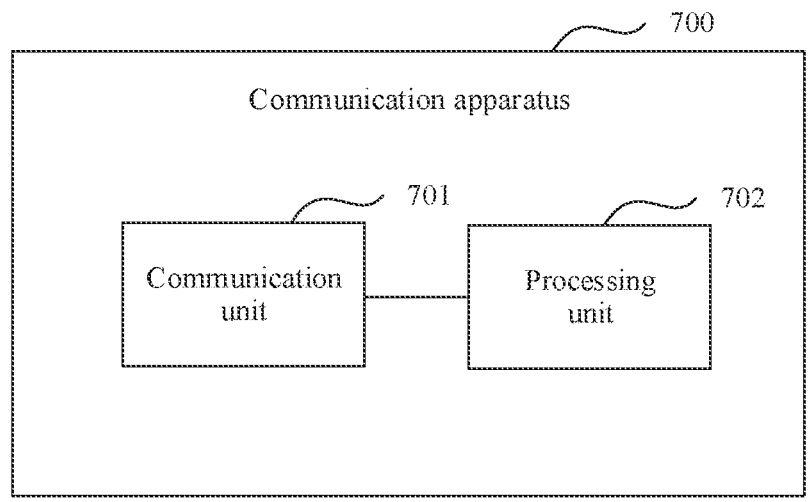
FIG. 7 is a structural diagram of a communication apparatus according to an embodiment of this application.

Based on a same technical concept, an embodiment of this application further provides a communication apparatus. A structure of the apparatus is that shown in FIG. 7, and the apparatus includes a communication unit 701 and a processing unit 702. The communication apparatus 700 may be used in a terminal device or a base station in the communication system shown in FIG. 2, and may implement the directional measurement method provided in the foregoing embodiment. The following describes functions of the units in the apparatus 700.

The communication unit 701 is configured to receive and send data. The communication unit 701 may be implemented by using a transceiver, and the transceiver may include at least one antenna and a radio frequency circuit.

In an implementation, the communication apparatus 700 is used in the terminal device. The following describes a function of the processing unit 702 in this case.

The processing unit 702 is configured to:
determine a to-be-measured receive beam; and
perform received signal strength indication RSSI measurement on the to-be-measured receive beam.

Optionally, when determining the to-be-measured receive beam, the processing unit 702 is specifically configured to:
determine a first transmit beam, where the first transmit beam is a transmit beam used by a base station;
determine a first receive beam based on a correspondence between a transmit beam of the base station and a receive beam of the terminal device, where the first receive beam is a receive beam, of the terminal device, corresponding to the first transmit beam; and
determine that the to-be-measured receive beam is the first receive beam.

Optionally, when determining the first transmit beam, the processing unit 702 is specifically configured to:

obtain a signal index of a first downlink reference signal, where the first downlink reference signal is a downlink reference signal sent by the base station; and
determine, based on a correspondence between a signal index of a downlink reference signal and a transmit beam of the base station, the first transmit beam corresponding to the signal index of the first downlink reference signal.

Optionally, when obtaining the signal index of the first downlink reference signal, the processing unit 702 is specifically configured to:
receive system information from the base station through the communication unit 701, and obtain the signal index of the first downlink reference signal from the system information;
determine first random access information, where the first random access information is used by the terminal device to perform random access, and determine, based on a correspondence between random access information and a signal index of a downlink reference signal, the signal index, of the first downlink reference signal, corresponding to the first random access information; or
determine configuration information of a first uplink reference signal, where the first uplink reference signal is an uplink reference signal sent by the terminal device to the base station, and determine, based on a correspondence between configuration information of an uplink reference signal and a signal index of a downlink reference signal, the signal index, of the first downlink reference signal, corresponding to the configuration information of the first uplink reference signal.

Optionally, the correspondence between the random access information and the signal index of the downlink reference signal is carried in RRC signaling.

Optionally, the first random access information is a random access time-frequency position of the terminal device, or the first random access information is a random access time-frequency position and a random access preamble of the terminal device.

Optionally, when determining the to-be-measured receive beam, the processing unit 702 is specifically configured to:
receive first measurement configuration information from a base station through the communication unit 701, where the first measurement configuration information is used to indicate the to-be-measured beam; and
determine the to-be-measured receive beam based on the first measurement configuration information.

Optionally, the first measurement configuration information includes a signal index of a second downlink reference signal. When determining the to-be-measured receive beam based on the first measurement configuration information, the processing unit 702 is specifically configured to:
obtain the signal index of the second downlink reference signal included in the first measurement configuration information;
determine a second transmit beam based on a correspondence between a signal index of a downlink reference signal and a transmit beam of the base station, where the second transmit beam is a transmit beam, of the base station, corresponding to the signal index of the second downlink reference signal;
determine a second receive beam based on a correspondence between a transmit beam of the base station and a receive beam of the terminal device, where the second receive beam is a receive beam, of the terminal device, corresponding to the second transmit beam; and
determine that the to-be-measured receive beam is the second receive beam.

Optionally, the first measurement configuration information includes configuration information of a second uplink reference signal. When determining the to-be-measured receive beam based on the first measurement configuration information, the processing unit 702 is specifically configured to:

obtain the configuration information of the second uplink reference signal included in the first measurement configuration information, determine a third transmit beam based on the configuration information of the second uplink reference signal, where the third transmit beam is a transmit beam used by the terminal device to send the second uplink reference signal, determine a third receive beam of the terminal device based on the third transmit beam of the terminal device, where a configuration of the third receive beam is the same as that of the third transmit beam, and determine that the to-be-measured receive beam is the third receive beam; or obtain the configuration information of the second uplink reference signal included in the first measurement configuration information, determine, based on a correspondence between configuration information of an uplink reference signal and a signal index of a downlink reference signal, a signal index, of a second downlink reference signal, corresponding to the configuration information of the second uplink reference signal, determine a fourth transmit beam based on a correspondence between a signal index of a downlink reference signal and a transmit beam of the base station, where the fourth transmit beam is a transmit beam, of the base station, corresponding to the index of the second downlink reference signal, determine a fourth receive beam based on a correspondence between a transmit beam of the base station and a receive beam of the terminal device, where the fourth receive beam is a receive beam, of the terminal device, corresponding to the fourth transmit beam, and determine that the to-be-measured receive beam is the fourth transmit beam.

Optionally, the correspondence between the configuration information of the uplink reference signal and the signal index of the downlink reference signal is carried in RRC signaling.

Optionally, the first measurement configuration information includes an identifier of a fifth transmit beam of the base station. When determining the to-be-measured receive beam based on the first measurement configuration information, the processing unit 702 is specifically configured to:

obtain the identifier of the fifth transmit beam included in the first measurement configuration information;

determine an identifier of a fifth receive beam based on a correspondence between an identifier of a transmit beam of the base station and an identifier of a receive beam of the terminal device, where the identifier of the fifth receive beam is an identifier, of a receive beam of the terminal device, corresponding to the identifier of the fifth transmit beam; and determine that the to-be-measured receive beam is the fifth receive beam.

Optionally, a receive beam and a transmit beam of the terminal device have indexes.

Optionally, the processing unit 702 is further configured to:

receive second measurement configuration information from the base station through the communication unit 701, where the second measurement configuration information is used to indicate an RSSI measurement timing configuration WIT window; and when performing RSSI measurement on the to-be-measured receive beam, the processing unit 702 is specifically configured to:

perform RSSI measurement on the to-be-measured receive beam in the RMTC window.

Optionally, the processing unit 702 is further configured to:

before determining the to-be-measured receive beam, determine that there is interference on a current downlink receive beam, or receive a notification message from the base station through the communication unit 701, where the notification message is used to notify the terminal device to perform RSSI measurement.

Optionally, the processing unit 702 is further configured to:

after performing RSSI measurement on the to-be-measured receive beam, obtain an RSSI measurement result of the to-be-measured receive beam;

when there are a plurality of to-be-measured receive beams, separately quantize an RSSI measurement result of each to-be-measured receive beam to obtain a channel occupancy ratio of a channel covered by the to-be-measured receive beam, or quantize a sum of RSSI measurement results of all to-be-measured receive beams to obtain a channel occupancy ratio of a wide channel covered by the to-be-measured receive beams; and send an RSSI measurement report to the base station, where the RSSI measurement report includes the RSSI measurement result and the channel occupancy ratio of the channel covered by the to-be-measured receive beam or the channel occupancy ratio of the wide channel covered by the to-be-measured receive beams.

In another implementation, the communication apparatus 700 is used in the base station. The following describes a function of the processing unit 702 in this case.

The processing unit 702 is configured to: invoke program instructions in a memory, and send first measurement configuration information to a terminal device through the communication unit 701, where the first measurement configuration information is used to indicate a to-be-measured receive beam.

Optionally, the first measurement configuration information includes a signal index of a downlink reference signal; the first measurement configuration information includes configuration information of an uplink reference signal; or the first measurement configuration information includes an identifier of a transmit beam of the base station.

Optionally, the processing unit 702 is further configured to:

send second measurement configuration information to the terminal device through the communication unit 701, where the second measurement configuration information is used to indicate an RSSI measurement timing configuration RMTC window.

Optionally, the processing unit 702 is further configured to:

send RRC signaling to the terminal device through the communication unit 701, where the RRC signaling includes a correspondence between random access information and a signal index of a downlink reference signal, and/or a correspondence between configuration information of an uplink reference signal and a signal index of a downlink reference signal.

Optionally, the random access information is a random access time-frequency position, or the random access information is a random access time-frequency position and a random access preamble.

Optionally, the processing unit 702 is further configured to:

before sending the first measurement configuration information to the terminal device through the communication unit 701, determine that there is interference on a current downlink receive beam of the terminal device; and send a notification message to the terminal device through the communication unit 701, where the notification message is used to notify the terminal device to perform received signal strength indication RSSI measurement.

Optionally, the processing unit 702 is further configured to:

receive an RSSI measurement report from the terminal device through the communication unit 701, where the RSSI measurement report includes an RSSI measurement result obtained after the terminal device performs RSSI measurement and a channel occupancy ratio of a channel covered by each to-be-measured receive beam or a channel occupancy ratio of a wide channel covered by to-be-measured receive beams.

It should be noted that in the foregoing embodiments of this application, division into the modules is an example and is merely logical function division, and there may be another division manner during actual implementation. In addition, functional units in embodiments of this application may be integrated into one processing unit, or may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

Figure 8:
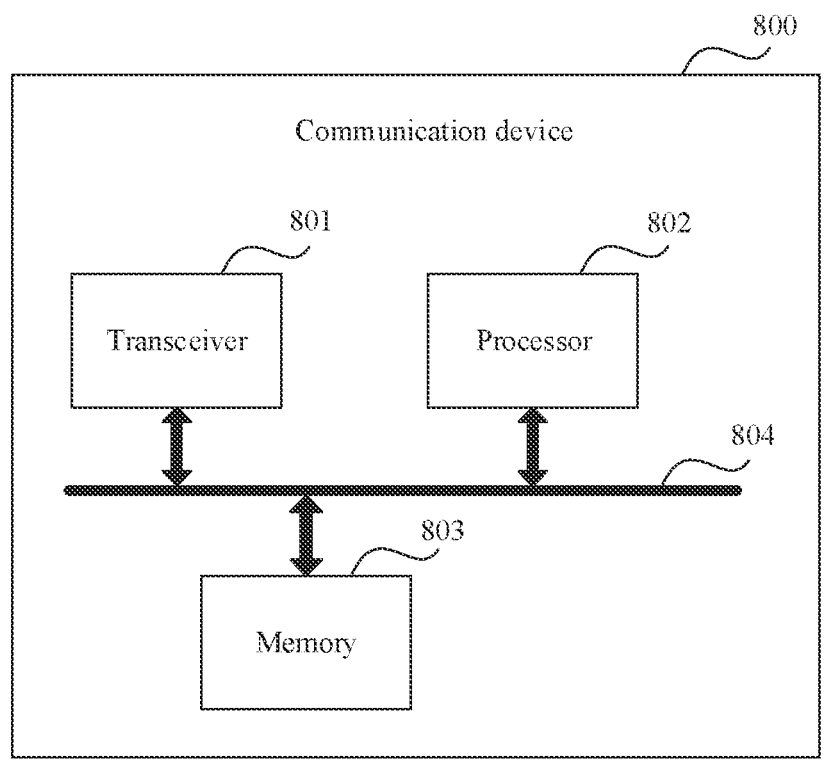
FIG. 8 is a structural diagram of a communication device according to an embodiment of this application.

Based on a same technical concept, an embodiment of this application further provides a communication device. The communication device 800 may be used in a terminal device or a base station in the communication system shown in FIG. 2, may implement the directional measurement method provided in the foregoing embodiment, and has a function of the communication apparatus shown in FIG. 7. Refer to FIG. 8. The communication device 800 includes a transceiver 801, a processor 802, and a memory 803. The transceiver 801, the processor 802, and the memory 803 are connected to each other.

Optionally, the transceiver 801, the processor 802, and the memory 803 are connected to each other by using a bus 804. The bus 804 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one bold line is used in FIG. 8 to represent the bus, but it does not indicate that there is only one bus or one type of bus.

The transceiver 801 is configured to receive and send data, to communicate with another device in the communication system. Optionally, the transceiver 801 may be implemented by using a radio frequency apparatus and an antenna.

In an implementation, when the communication device 800 is used in the terminal device, the processor 802 is configured to implement a function of the terminal device in the directional measurement method provided in the foregoing embodiment. For details, refer to the descriptions in the foregoing embodiment. Details are not described herein again.

In another implementation, when the communication device 800 is used in the base station, the processor 802 is configured to implement a function of the base station in the directional measurement method provided in the foregoing embodiment. For details, refer to the descriptions in the foregoing embodiment. Details are not described herein again.

The processor 802 may be a central processing unit (central processing 11114, CPU), a network processor (network processor, NP), a combination of a CPU and an NP, or the like. The processor 802 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof. The processor 802 may implement the foregoing functions by hardware or certainly by hardware executing corresponding software.

The memory 803 is configured to store program instructions, data, and the like. Specifically, the program instructions may include program code, where the program code includes computer operation instructions. The memory 803 may include a random access memory (random access memory, RAM), and may further include a non-volatile memory (non-volatile memory), for example, at least one magnetic disk memory. The processor 802 executes the program instructions stored in the memory 803, to implement the foregoing functions, thereby implementing the directional measurement method provided in the foregoing embodiment.

It may be understood that the memory 803 in FIG. 8 of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMS may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification includes but is not limited to these and any memory of another appropriate type.

Based on the foregoing embodiment, an embodiment of this application further provides a computer program. When the computer program is run on a computer, the computer is enabled to perform the directional measurement method provided in the foregoing embodiment.

Based on the foregoing embodiment, an embodiment of this application further provides a computer-readable storage medium. The computer-readable storage medium stores a computer program. When the computer program is executed by a computer, the computer is enabled to perform the directional measurement method provided in the foregoing embodiment. The storage medium may be any usable medium can be accessed by the computer. The following provides an example but does not impose a limitation: The computer-readable medium may include a RAM, a ROM, an EEPROM, a CD-ROM, another compact disc storage or magnetic disk storage medium, another magnetic storage device, or any other medium that can carry or store expected program code in a form of instructions or a data structure and can be accessed by the computer.

Based on the foregoing embodiment, an embodiment of this application further provides a chip. The chip is configured to: read a computer program stored in a memory, and perform the directional measurement method provided in the foregoing embodiment.

Based on the foregoing embodiment, an embodiment of this application provides a chip system. The chip system includes a processor, configured to support a computer apparatus in implementing a function of the base station or the terminal device in the foregoing embodiment. In a possible design, the chip system further includes a memory, and the memory is configured to store a program and data that are necessary for the computer apparatus. The chip system may include a chip, or may include a chip and another discrete component.

In conclusion, embodiments of this application provide a directional measurement method and a device. In this solution, a terminal device may determine a to-be-measured receive beam, and perform RSSI measurement on the to-be-measured receive beam. According to the method, the terminal device may perform RSSI measurement on the to-be-measured receive beam in a targeted manner, and does not need to perform RSSI measurement in all directions. Therefore, in the method, directional RSSI measurement of the terminal device can be implemented, time and power that are consumed by the terminal device to perform RSSI measurement can be reduced, and RSSI measurement efficiency of the terminal device can be improved.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

Embodiments described in this specification may be independent solutions, or may be combined based on internal logic. All these solutions fall within the protection scope of this application.

It may be understood that, in the foregoing method embodiments, the method and the operation that are implemented by the terminal device may be implemented by a component (for example, a chip or a circuit) that may be used in the terminal device, and the method and the operation that are implemented by the base station may be implemented by a component (for example, a chip or a circuit) that may be used in the base station.

The foregoing mainly describes the solutions provided in embodiments of this application from a perspective of interaction. It may be understood that to implement the foregoing functions, the terminal device or the base station includes corresponding hardware structures and/or software modules for performing the functions. A person skilled in the art may be aware that, with reference to the examples described in embodiments disclosed in this specification, units and algorithm steps can be implemented by hardware or a combination of computer software and hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Certainly, a person skilled in the art can make various modifications and variations to this application without departing from the protection scope of this application. This application is intended to cover the modifications and variations of this application provided that they fall within the scope of the following claims and equivalent technologies of this application.

What is claimed is:

1. A method applicable to a terminal side apparatus, the method comprising:
   obtaining a signal index of a first downlink reference signal, wherein the first downlink reference signal is sent by a network side apparatus; and
   determining a first transmit beam corresponding to the signal index of the first downlink reference signal, wherein the first transmit beam is a transmit beam used by the network side apparatus;
   determining a first receive beam corresponding to the first transmit beam; and
   performing received signal strength indication (RSSI) measurement on the first receive beam.

2. The method according to claim 1, wherein the obtaining a signal index of a first downlink reference signal comprises:
   receiving system information from the network side apparatus, and obtaining the signal index of the first downlink reference signal from the system information;
   determining first random access information, wherein the first random access information is used by the terminal side apparatus to perform random access, and determining the signal index of the first downlink reference signal corresponding to the first random access information; or
   determining configuration information of a first uplink reference signal, wherein the first uplink reference signal is sent by terminal side apparatus to the network side apparatus, and
   determining the signal index of the first downlink reference signal corresponding to the configuration information of the first uplink reference signal.

3. The method according to claim 2, wherein a correspondence between the first random access information and the signal index of the first downlink reference signal is carried in Radio Resource Control (RRC) signaling.

4. The method according to claim 2, wherein the first random access information is a random access time-frequency position of the terminal side apparatus, or the first random access information is a random access time-frequency position and a random access preamble of the terminal side apparatus.

5. The method according to claim 1, wherein the determining the first transmit beam corresponding to the signal index of the first downlink reference signal, comprises:
   determining the first transmit beam based on a correspondence between the signal index of the downlink reference signal and the first transmit beam of the network side apparatus.

6. The method according to claim 1, wherein the determining a first receive beam corresponding to the first transmit beam, comprises:
   determining the first receive beam based on a correspondence between the first receive beam and the first transmit beam of the network side apparatus.

7. The method according to claim 1, further comprising:
   receiving first measurement configuration information from the network side apparatus, wherein the first measurement configuration information is used to indicate the first receive beam; and
   determining the first receive beam based on the first measurement configuration information.

8. A method applicable to a network side apparatus, the method comprising:
   sending first measurement configuration information to a terminal side apparatus, wherein the first measurement configuration information is used to indicate a to-be-measured receive beam; and
   sending radio resource control (RRC) signaling to the terminal side apparatus, wherein the RRC signaling comprises at least one of a correspondence between random access information and a signal index of a downlink reference signal, or a correspondence between configuration information of an uplink reference signal and a signal index of a downlink reference signal, and
   wherein the random access information is a random access time-frequency position, or the random access information is a random access time-frequency position and a random access preamble.

9. The method according to claim 8, wherein:
   the first measurement configuration information comprises a signal index of a downlink reference signal;
   the first measurement configuration information comprises configuration information of an uplink reference signal; or
   the first measurement configuration information comprises an identifier of a transmit beam of the network side apparatus.

10. The method according to claim 8, further comprising:
    sending second measurement configuration information to the terminal side apparatus, wherein the second measurement configuration information is used to indicate a received signal strength indication (RSSI) measurement timing configuration (RMTC) window.

11. A method applicable to a network side apparatus, the method comprising:
    determining that there is interference on a current downlink receive beam of a terminal side apparatus; and
    sending a notification message to the terminal side apparatus, wherein the notification message is used to notify the terminal side apparatus to perform received signal strength indication (RSSI) measurement;
    sending first measurement configuration information to the terminal side apparatus, wherein the first measurement configuration information is used to indicate a to-be-measured receive beam.

12. A method applicable to a network side apparatus, the method comprising:
    sending first measurement configuration information to a terminal side apparatus, wherein the first measurement configuration information is used to indicate a to-be-measured receive beam; and
    receiving a received signal strength indication (RSSI) measurement report from the terminal side apparatus, wherein the RSSI measurement report comprises an RSSI measurement result obtained after the terminal side apparatus performs RSSI measurement and a channel occupancy ratio of a channel covered by each to-be-measured receive beam or a channel occupancy ratio of a wide channel covered by to-be-measured receive beams.

13. A terminal side apparatus comprising:
    a transceiver; and
    at least one processor coupled to at least one memory storing programming instructions for execution by the at least one processor to perform operations comprising:

obtaining a signal index of a first downlink reference signal, wherein the first downlink reference signal is a downlink reference signal sent by a network side apparatus; and determining a first transmit beam corresponding to the signal index of the first downlink reference signal, wherein the first transmit beam is a transmit beam used by the network side apparatus;

determining a first receive beam corresponding to the first transmit beam; and performing received signal strength indication (RSSI) measurement on the first receive beam.

14. The terminal side apparatus according to claim 13, wherein obtaining the signal index of the first downlink reference signal comprises:

receiving system information from the network side apparatus through the transceiver, and obtaining the signal index of the first downlink reference signal from the system information;

determining first random access information, wherein the first random access information is used by the terminal side apparatus to perform random access, and determining, based on a correspondence between random access information and a signal index of a downlink reference signal, the signal index of the first downlink reference signal corresponding to the first random access information; or determining configuration information of a first uplink reference signal, wherein the first uplink reference signal is an uplink reference signal sent by the terminal side apparatus to the network side apparatus, and determine the signal index of the first downlink reference signal corresponding to the configuration information of the first uplink reference signal.

15. The terminal side apparatus according to claim 14, wherein a correspondence between the first random access information and the signal index of the first downlink reference signal is carried in radio resource control (RRC) signaling.

16. The terminal side apparatus according to claim 14, wherein the first random access information is a random access time-frequency position of the terminal side apparatus, or the first random access information is a random access time-frequency position and a random access preamble of the terminal side apparatus.

17. The terminal side apparatus according to claim 13, wherein determining the first receive beam comprises:

receiving first measurement configuration information from the network side apparatus through the transceiver, wherein the first measurement configuration information is used to indicate a to-be-measured receive beam;

determining the to-be-measured receive beam based on the first measurement configuration information; and determine that the to-be-measured receive beam is the first receive beam.

18. A network side apparatus, comprising:
a transceiver; and
at least one processor coupled to at least one memory storing programming instructions for execution by the at least one processor to perform operations comprising:

sending first measurement configuration information to a terminal side apparatus through the transceiver, wherein the first measurement configuration information is used to indicate a to-be-measured receive beam; and sending radio resource control (RRC) signaling to the terminal side apparatus through the transceiver, wherein the RRC signaling comprises at least one of a correspondence between random access information and a signal index of a downlink reference signal, or a correspondence between configuration information of an uplink reference signal and a signal index of a downlink reference signal.

19. The base station network side apparatus according to claim 18, wherein:

the first measurement configuration information comprises a signal index of a downlink reference signal;

the first measurement configuration information comprises configuration information of an uplink reference signal; or the first measurement configuration information comprises an identifier of a transmit beam of the network side apparatus.

20. The network side apparatus according to claim 18, wherein the operations comprise:

sending second measurement configuration information to the terminal side apparatus through the transceiver, wherein the second measurement configuration information is used to indicate a received signal strength indication (RSSI) measurement timing configuration (RMTC) window.

21. The network side apparatus according to claim 18, wherein the random access information is a random access time-frequency position, or the random access information is a random access time-frequency position and a random access preamble.

22. A network side apparatus comprising:
a transceiver; and
at least one processor coupled to at least one memory storing programming instructions for execution by the at least one processor to perform operations comprising:

determining that there is interference on a current downlink receive beam of a terminal side apparatus; and sending a notification message to the terminal side apparatus through the transceiver, wherein the notification message is used to notify the terminal side apparatus to perform received signal strength indication (RSSI) measurement; and sending first measurement configuration information to the terminal side apparatus through the transceiver, wherein the first measurement configuration information is used to indicate a to-be-measured receive beam.

23. A network side apparatus comprising:
a transceiver; and
at least one processor coupled to at least one memory storing programming instructions for execution by the at least one processor to perform operations comprising:

sending first measurement configuration information to a terminal side apparatus through the transceiver, wherein the first measurement configuration information is used to indicate a to-be-measured receive beam; and receiving a received signal strength indication (RSSI) measurement report from the terminal side apparatus through the transceiver, wherein the RSSI measurement report comprises an RSSI measurement result obtained after the terminal side apparatus performs RSSI measurement and a channel occupancy ratio of a channel covered by each to-be-measured receive beam or a channel occupancy ratio of a wide channel covered by to-be-measured receive beams.

\* \* \* \* \*

UNITED STATES PATENT AND TRADEMARK OFFICE
CERTIFICATE OF CORRECTION

PATENT NO. : 12,261,670 B2  
APPLICATION NO. : 17/855631  
DATED : March 25, 2025  
INVENTOR(S) : Liang Qiao, Jiayin Zhang and Weiwei Fan Page 1 of 1

It is certified that error appears in the above-identified patent and that said Letters Patent is hereby corrected as shown below:

In the Claims

In Column 33, In Line 33, In Claim 2, after "by" insert -- the --.

In Column 36, In Line 9 (Approx.), In Claim 19, after "The" delete "base station".

Signed and Sealed this  
Twenty-second Day of July, 2025

Coke Morgan Stewart  
*Acting Director of the United States Patent and Trademark Office*